United States Patent
Chung et al.

(10) Patent No.: US 7,702,844 B2
(45) Date of Patent: Apr. 20, 2010

(54) ADDRESS MAPPING METHOD AND MAPPING INFORMATION MANAGING METHOD FOR FLASH MEMORY, AND FLASH MEMORY USING THE SAME

(75) Inventors: Tae-sun Chung, Seoul (KR); Ji-hyun In, Seongnam-si (KR); Myung-jin Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 408 days.

(21) Appl. No.: 11/018,673

(22) Filed: Dec. 22, 2004

(65) Prior Publication Data

US 2005/0144368 A1    Jun. 30, 2005

(30) Foreign Application Priority Data

Dec. 30, 2003    (KR)    ............... 10-2003-0100488

(51) Int. Cl.
 *G06F 12/00*    (2006.01)
(52) U.S. Cl. ............. 711/103; 711/202; 711/E12.008
(58) Field of Classification Search ............. None
See application file for complete search history.

(56) References Cited

U.S. PATENT DOCUMENTS

| | | |
|---|---|---|
| 5,404,485 A | 4/1995 | Ban |
| 5,740,396 A | 4/1998 | Mason |
| 5,905,993 A | 5/1999 | Shinohara |
| 5,937,425 A | 8/1999 | Ban |
| 6,381,176 B1 | 4/2002 | Kim et al. |

(Continued)

FOREIGN PATENT DOCUMENTS

EP    0 597 706 A2    5/1994

(Continued)

OTHER PUBLICATIONS

Miller, Frank. Simple Memory Protection for Embedded Operating System Kernels. USENIX 2002 Annual Techical Conference, Freenix Track Paper [online], [retrieved on Jan. 31, 2007]. Retrieved from the Internet <URL: http://www.usenix.org/events/usenix02/tech/freenix/full_papers/miller/miller_html/index.html.*

(Continued)

*Primary Examiner*—Reginald G Bragdon
*Assistant Examiner*—Larry T Mackall
(74) *Attorney, Agent, or Firm*—Sughrue Mion, PLLC

(57) ABSTRACT

A method for minimizing the degradation of performance upon accessing a flash memory using a logical-physical mapping scheme, and a method for efficiently storing and managing information on logical-physical mapping in a flash memory. A method for writing data in a flash memory includes determining whether a sector is empty in a physical page having a most recently written logical page number of data to be written, the offset of the sector matching that of the data to be written; if the sector is empty, writing the data in the sector to the physical page; and if the sector is not empty, selecting an empty physical page to write the data to a sector in the selected empty physical page of which the offset matches that of the data to be written and writing a logical page number for the data to the selected empty physical page.

19 Claims, 21 Drawing Sheets

U.S. PATENT DOCUMENTS

| | | |
|---|---|---|
| 2002/0099904 A1* | 7/2002 | Conley ............... 711/103 |
| 2003/0033471 A1 | 2/2003 | Lin et al. |
| 2003/0046484 A1 | 3/2003 | Lasser |
| 2003/0065876 A1* | 4/2003 | Lasser ............... 711/103 |
| 2003/0093610 A1 | 5/2003 | Lai et al. |
| 2005/0055493 A1* | 3/2005 | Wang ............... 711/103 |

FOREIGN PATENT DOCUMENTS

| | | |
|---|---|---|
| JP | 2002366423 | 12/2002 |
| JP | 2003216483 | 7/2003 |
| JP | 2004078907 | 3/2004 |
| WO | 02058074 A2 | 7/2002 |
| WO | 03030180 A1 | 1/2003 |
| WO | 03021448 A1 | 3/2003 |

OTHER PUBLICATIONS

Kim et al. A Space-efficient Flash Translation Layer for Compactflash Systems. IEEE Transactions on Consumer Electronics, vol. 48 No. 2. [online], [retrived on Jan. 23, 2007]. Retrieved from the Internet <URL: http://ieeexplore.ieee.org/iel5/30/21778/01010143.pdf?arnumber=1010143>.*

Gupta et al. Garbage Collection in a Distributed Object-Oriented System. IEEE Transactions on Knowledge and Data Engineering, vol. 5, No. 2, [online] Apr. 2003, [retrieved on Aug. 6, 2007]. Retrieved from the internet <URL:http://ieeexplore.ieee.org/iel3/69/5754/00219734.pdf?tp=&arnumber=219734&isnumber=5754>.*

* cited by examiner

US 7,702,844 B2

ADDRESS MAPPING METHOD AND MAPPING INFORMATION MANAGING METHOD FOR FLASH MEMORY, AND FLASH MEMORY USING THE SAME

This application claims the priority of Korean Patent Application No. 10-2003-0100488 filed on Dec. 30, 2003, in the Korean Intellectual Property Office, the disclosure of which is incorporated herein in its entirety by reference.

FIELD OF INVENTION

The present invention relates to a method for accessing a flash memory, and more particularly, to a method for reducing the degradation of performance when accessing a flash memory using a logical-physical mapping scheme, and a method for efficiently storing and managing information on logical-physical mapping in a flash memory.

DESCRIPTION OF THE PRIOR ART

Flash memories are widely used in applications such as embedded systems and mobile devices since they have high access speed and low power consumption while being non-volatile in the same manner as hard disks.

In order to perform a write operation in an already written sector of a flash memory, an operation of erasing an entire block including the sector should be performed in advance, in consideration of the hardware features of the flash memory. This is a primary reason for the degradation in performance of the flash memory.

To solve the above erase-before-write problem, the concept of logical and physical addresses has been introduced. That is, a read/write operation for a logical address requested from a host end is converted into a read/write operation for an actual physical address of a flash memory by several types of mapping algorithms. At this time, it is possible to maximize the performance of the flash memory since its physical state is taken into consideration.

Recently, in order to enhance the performance of the flash memory system, a flash memory has been developed in which successive flash operations can be buffered and handled at one time. This flash memory is called a large block flash memory. However, if an existing logical-physical mapping algorithm is applied to a large block flash memory as it is, the advantage of the large block flash memory cannot be sufficiently achieved. Thus, there is a need for an efficient logical-physical mapping algorithm for a large block flash memory, like the present invention.

Conventional techniques for flash memory logical-physical mapping schemes are described in U.S. Pat. Nos. 5,404,485 and 5,937,425 assigned to 'M-Systems Flash Disk Pioneer,' U.S. Pat. No. 5,905,993 assigned to 'Mitsubishi,' U.S. Pat. No. 6,381,176 assigned to 'Samsung Electronics,' etc. The core of a flash memory access method in such prior arts relate to how a write operation is efficiently performed in an actual physical sector of the flash memory in response to a write request for a logical sector requested from a host end. Here, assuming that an erase operation is performed on a block basis and a read/write operation is performed on a sector basis in the flash memory, the prior art is roughly divided into a sector mapping scheme and a block mapping scheme.

FIG. 1 illustrates an example of a conventional sector mapping. A virtual address, composed of a sector number and an offset of the sector number, is translated into a logical address by means of mapping information on the sector basis that has been stored in the flash memory. A logical block number can then be derived from an upper bit of the obtained logical address. A last physical address will be derived from a logical block-physical block table stored in a main memory.

FIG. 2 illustrates an example of a conventional block mapping. A virtual block has a primary block and a replacement block mapped thereto. That is, one sector in any logical block will be mapped to one sector in the other block by means of the mapping information on a block basis. At this time, if other data have been already written in a relevant sector in the primary block, data are written in the replacement block.

The flash memory includes three primary operations of read, write and erase. The primary content of the present invention is related to the read and write operations. Since the read operation and write operation have no significant difference therebetween in operation, the write operation in the prior art will be discussed herein.

A host forwards a logical sector number (LSN) to write data in a flash memory. In a sector-mapping scheme as in FIG. 1, since a mapping table for LSN and PSN (physical sector number) exists, it suffices to write the data in the relevant PSN. At this time, in the case where data already exists in the relevant PSN, another empty PSN is found. Data are written in the found PSN and the mapping information is modified.

In the block-mapping scheme as in FIG. 2, a logical block number (LBN) is obtained from a given LSN, a physical block number (PBN) is found from an existing LBN-PBN mapping table and a PSN having a matched offset is found to write data therein. When data has already filled the sector as in the sector mapping, data are written in a sector in a writable block and the mapping information is modified.

Large block flash memory, which has been recently developed, provides a reading and writing scheme for two or more sectors. That is, assuming that an operation is performed on a page basis in the flash memory and the size of the page is equal to four sectors, it is possible to read or write four sectors at one time. However, because an existing logical-physical mapping algorithm assumes that the sector size of a host is identical to the basis for the operation of the flash memory, the advantage of the large block flash memory cannot be obtained when existing algorithms are applied to the large block flash memory. In particular, even though the large block flash memory exhibits excellent performance with respect to write operations for one or more successive sectors (multiple sector write operations), the existing algorithms do not consider such a feature.

SUMMARY OF THE INVENTION

The present invention is conceived to solve the aforementioned problem. An object of the present invention is to provide a logical-physical mapping algorithm suitable for a large block flash memory.

Another object of the present invention is to provide a method by which the performance of a flash memory system can be maximized and the system can be recovered even under sudden power failure through a logical-physical mapping information managing method.

Consistent with an exemplary embodiment of the present invention for achieving the aforementioned objects, there is provided a method for writing data in a flash memory including at least one block having a page composed of a predetermined number of sectors, in which the data are written on a sector or page basis and are erased on a block basis. The method comprises a first step of determining whether a sector is empty in a physical page having a most recently written logical page number of data to be written, the offset of the sector matching that of the data to be written; a second step of, if it is determined that the sector of which the offset matches is empty, writing the data in the sector to the physical page of which the offset matches; and a third step of, if it is determined that the sector of which the offset matches is not empty, selecting an empty physical page to write the data to a sector in the selected empty physical page of which the offset matches that of the data to be written and writing a logical page number for the data to the selected empty physical page.

Consistent with an exemplary embodiment of the present invention, there is provided a method for writing data in a flash memory, comprising a first step of determining whether an empty sector exists in a physical page having the most recently written logical page number of the data to be written, the empty sector being capable of storing data to be written; a second step of, if it is determined that the empty sector exists, writing the data to the empty sector in the physical page and writing a logical sector number for the data to the physical page; and a third step of, if it is determined that an empty sector does not exist, selecting an empty physical page to write the data to an empty sector in the selected physical page and writing the logical page number and the logical sector number for the data to the selected empty physical page.

Consistent with an exemplary embodiment of the present invention, there is provided a method for writing data in a flash memory, comprising a first step of determining whether an empty sector that can store data to be written exists in a current block; and a second step of, if it is determined that the empty sector exists, writing the data to the empty sector and writing a logical sector number for the data to a physical page that is the same as the physical page where the empty sector is positioned.

Consistent with an exemplary embodiment of the present invention, there is provided a flash memory comprising at least one block having a page composed of a predetermined number of sectors, in which data are written on a sector or page basis and are erased on a block basis. The flash memory determines whether any sector of which the offset matches the data to be written is empty in a physical page having the most recently written logical page number of the data to be written. If it is determined that the sector of which the offset matches is empty, the flash memory writes the data to the sector of which the offset matches in the physical page. If it is determined that the sector of which the offset matches is not empty, the flash memory selects an empty physical page to write the data to the sector of which the offset matches that of the data to be written and writes the logical page number for the data to the selected empty physical page.

Consistent with an exemplary embodiment of the present invention, there is provided a flash memory, wherein it is determined whether an empty sector capable of storing data to be written exists in a physical page having the most recently written logical page number of the data to be written. If it is determined that an empty sector exists, the flash memory writes the data to the empty sector in the physical page and writes a logical sector number for the data to the physical page. If it is determined that an empty sector does not exist, an empty physical page is selected to write the data to an empty sector in the selected physical page and writes the logical page number and the logical sector number for the data to the selected empty physical page.

Consistent with an exemplary embodiment of the present invention, there is provided a flash memory, wherein a determination is made as to whether an empty sector capable of storing data to be written exists in the current block, and if an empty sector exists, data are written to the empty sector and a logical sector number for the data are written to a physical page identical to the physical page in which the empty sector is positioned.

Consistent with an exemplary embodiment of the present invention, there is provided a flash memory composed of a plurality of blocks, comprising at least one map segment unit in which some of the blocks are allocated as separate map blocks to store logical-physical mapping information. At this time, the map blocks store the mapping information divided into segments. The mapping information is updated by writing the map segment unit storing the modified information to an empty unit in the map block when the mapping information is modified.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE INVENTION

Figure 1:
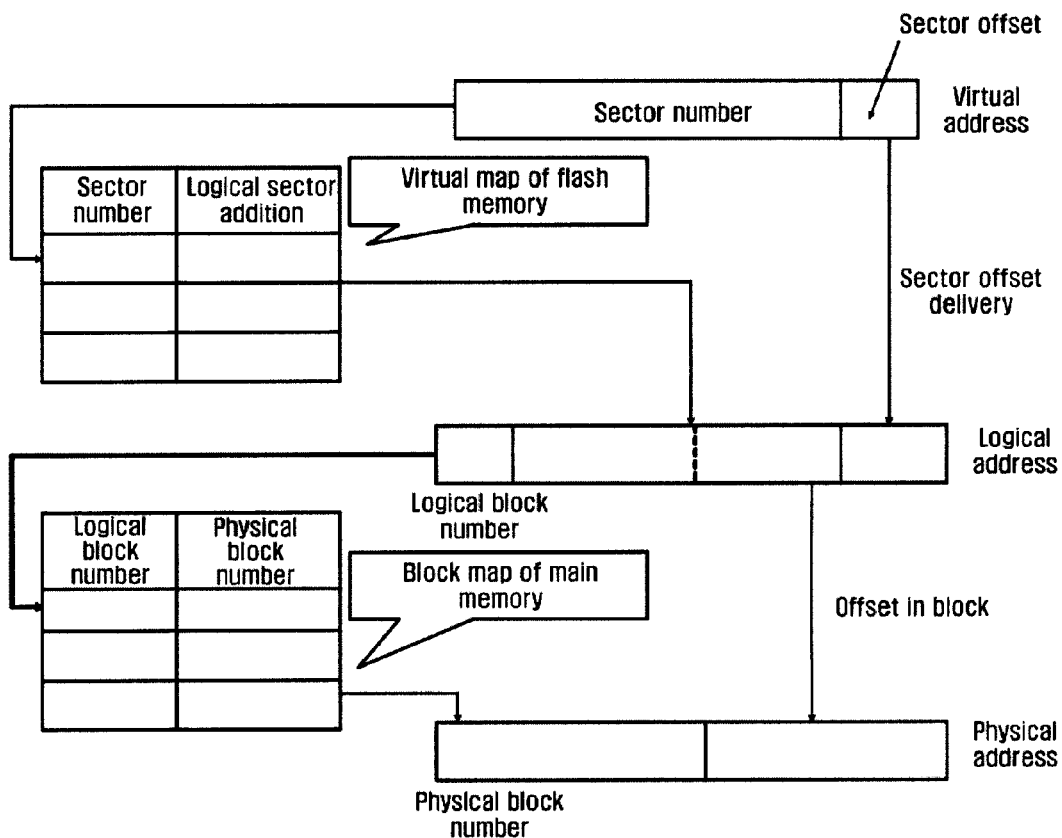
FIG. 1 is a diagram illustrating an example of a sector mapping.
Figure 2:
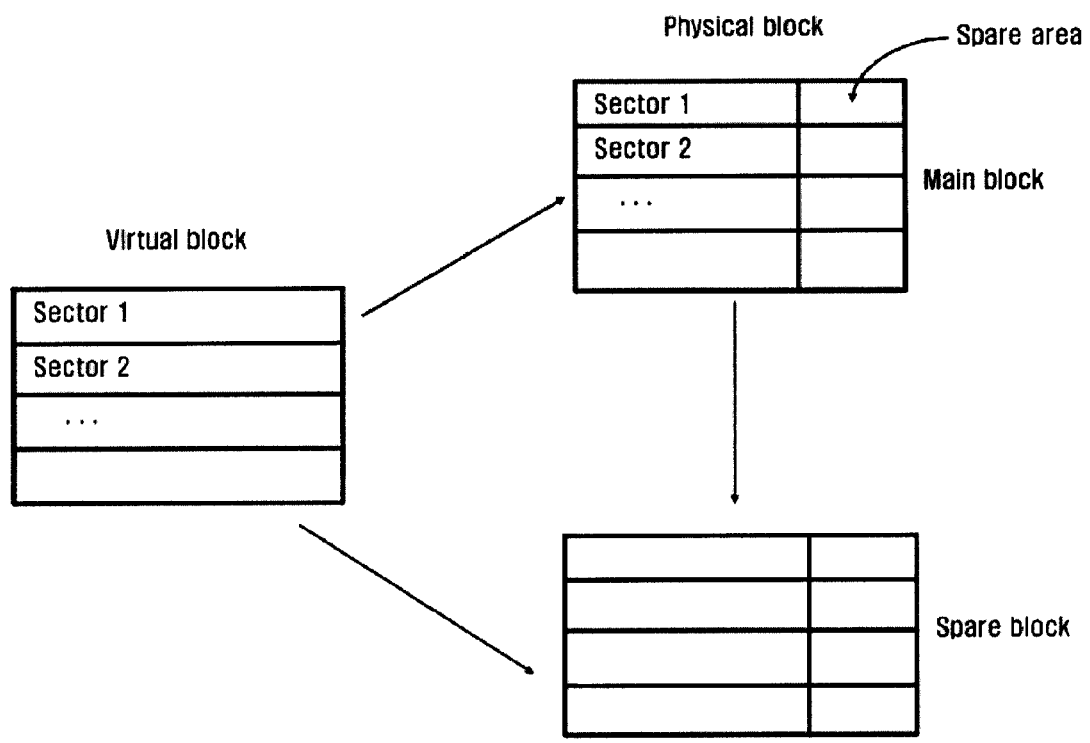
FIG. 2 is a diagram illustrating an example of a conventional block mapping.

Hereinafter, exemplary embodiments of the present invention will be described in detail with respect to the accompanying drawings. The advantages and features of the present invention, and a method for achieving the advantage and features will be apparent from the embodiments discussed below in detail in connection with the accompanying drawings. However, the present invention is not limited to embodiments disclosed below and will be implemented in various different forms. The exemplary embodiments described are intended for complete disclosure of the present invention, and are provided for completely indicating the scope of the present invention to a person skilled in the art to which the present invention belongs. The present invention is only defined by the scope of the claims. Like reference numerals indicate like components throughout the description herein.

Figure 3:
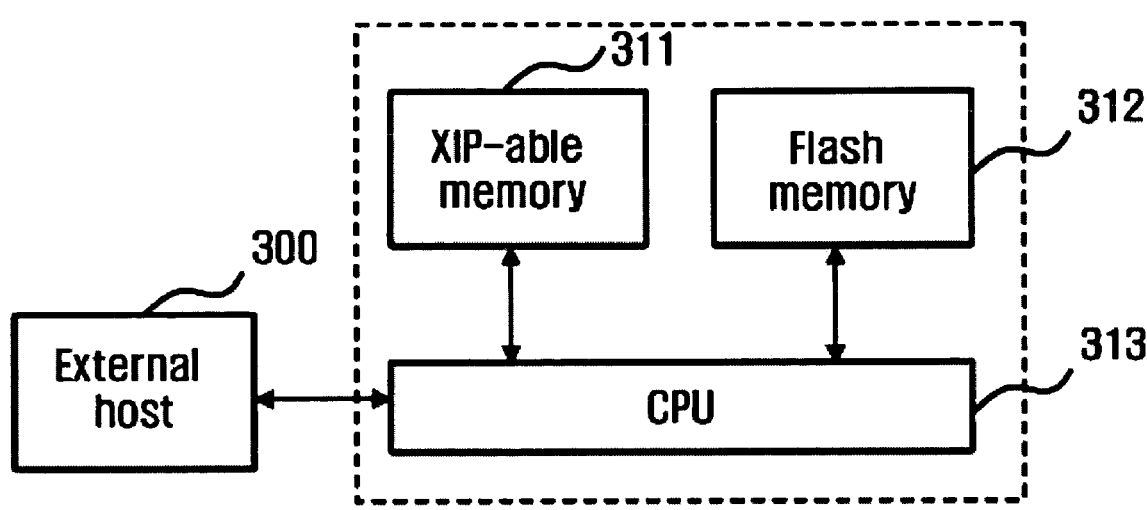
FIG. 3 is a diagram illustrating an entire structure of a system with a flash memory running thereon.

FIG. 3 illustrates an entire structure of a system with a flash memory running thereon. An XIP-able memory 311 is a memory capable of execute-in-place (XIP) functions, such as a read-only memory (ROM) or a random-access memory (RAM). A program code can be loaded and performed on such memories. Among such memories, the RAM is volatile while the ROM is nonvolatile. The flash memory 312 is not an aforementioned XIP-able memory 311 but is a simple memory for storing data that has a non-volatile feature. CPU 313 serves to convert read/write operations, requested from an external host 300, into read/write operations for the flash memory by executing a flash memory access code that is loaded into a directly (self) executable memory.

Figure 4:
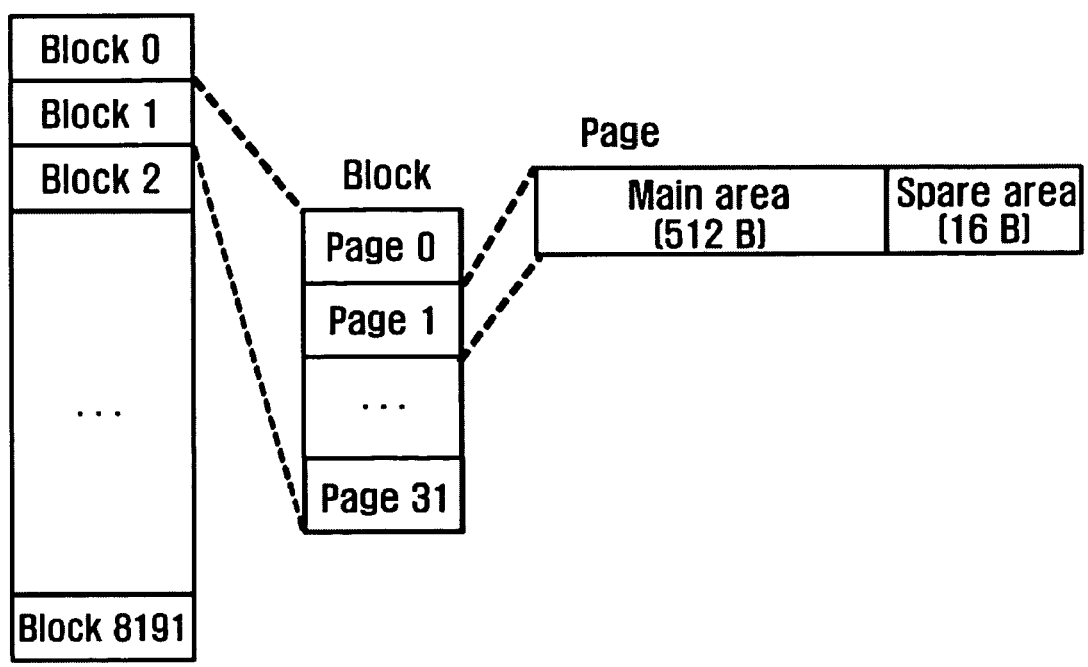
FIG. 4 is a diagram illustrating a configuration of a conventional small block flash memory of a NAND type.
Figure 5:
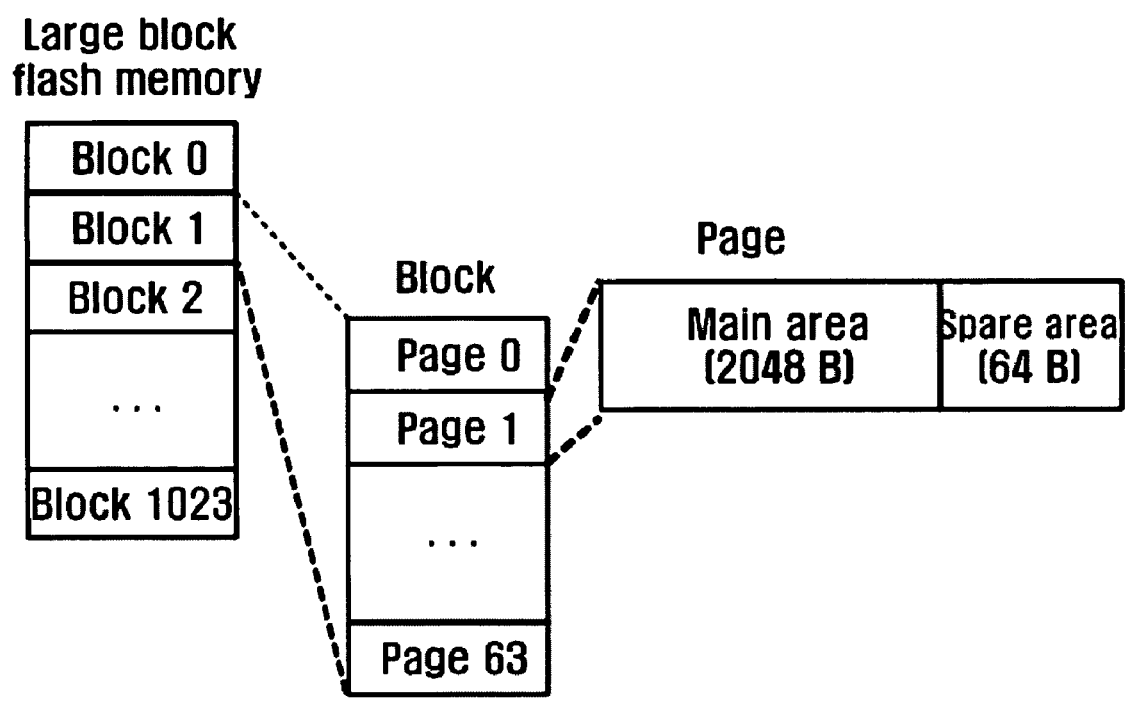
FIG. 5 is a diagram illustrating a configuration of a conventional large block flash memory of a NAND type.

FIGS. 4 and 5 illustrate a configuration of an actual flash memory of a 128 MB NAND type. It is to be noted that the present invention can be applied to flash memories of a storage capacity different in size. The small block flash memory shown in FIG. 4 is a system in which the basis for a read/write operation for data requested from an external host is the same as that for a read/write operation actually provided by a flash memory. For example, if a read or write request is made on a 512B basis by the external host, reading and writing is made on a 512B basis even in the flash memory, as well. In the case of a 128 MB flash memory as in FIG. 4, one page consists of a main area 512B and a spare area 16B, and a block as the basis for an erase operation consists of 32 pages.

In the case of a large block flash memory as in FIG. 5, the basis for a read/write operation of the flash memory is a multiple of the basis for a read/write operation requested by the external host. Particularly, in an example of FIG. 5, it can be seen that the size of one page in the flash memory is the same as the size of four sectors, and a block as the basis for an erase operation consists of 64 pages.

Figure 6:
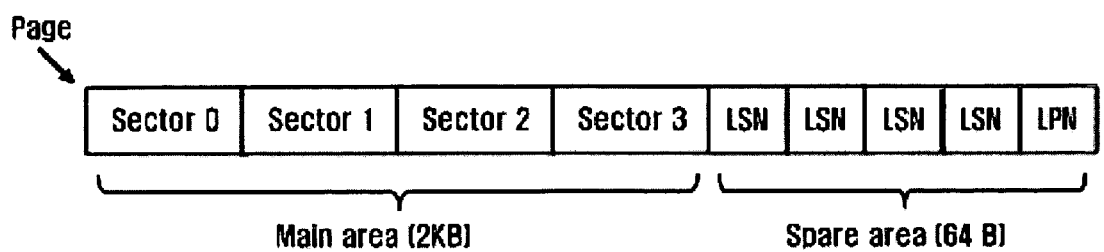
FIG. 6 is a diagram illustrating a basic format of a page that is the basis for a read/write operation in a large block flash memory.

FIG. 6 illustrates a basic format of a page that is the basis for a read/write operation of a large block flash memory. Recently, large block flash memories that are commonly used have a page four times the size of a page in a small block flash memory, and accordingly, four sectors can be stored in the main area of the large block flash memory. However, it will be understood by a person skilled in the art that even though four or more or less sectors are stored in one page, the concept of the present invention can be equally applied. Several types of meta information can be stored in a spare area. Primary meta information can include 'LSN (logical sector number)' as a logical sector number per each sector and 'LPN (logical page number)' as a logical page number for one page of the flash memory. Thus, the logical-physical mapping information may be stored in each page of the flash memory, but a different method can be considered in which mapping table information is separately stored in a part of the entire area of the flash memory.

The present invention is directed to a method of converting a read/write request from a host end for the logical address into a read/write request for the physical address of a large block flash memory. The invention will be discussed by way of a logical-physical address mapping method for a large block and a logical-physical address mapping information managing method.

Logical-physical Address Mapping Method

First, a logical-physical address mapping algorithm for a large block will be discussed. A primary operation of the flash memory includes a write operation and a read operation, and because the read operation is merely the reverse of the write operation, the write operation will be discussed.

There are two kinds of write operations requested by an external host. One is a single sector write operation inputting an LSN and relevant data, and the other is a multiple sector write operation inputting a start LSN, the number of continuous LSNs, and the relevant data. Since the large block flash memory system is able to perform a concurrent write operation for at least one sector, it can provide excellent performance in multiple sector write operations. Additionally, since one page in a recent mass capacity flash memory that is commonly used, is composed of four sectors, a logical-physical address mapping algorithm of a large block flash memory of which one page is composed of four sectors will be discussed as an example of the present invention.

The large block flash memory can accommodate various logical-physical address mapping algorithms as compared to a small block flash memory in that one page of the large block flash memory is composed of several sectors and has a structure capable of multiple sector write operations, unlike the small block flash memory.

That is, the conventional small block flash memory system has a block and a sector as the basis for basic logical mapping while the large block flash memory has a page as well as the block and the sector as the basis for basic mapping. As mentioned above, in the case of a single sector write operation, an input of the write operation of the large block flash memory is LSN and the relevant data, and the input is translated by a mapping algorithm into a physical sector number (PSN), which is a physical address of the flash memory.

First, a LBN that is a logical block number corresponding to the LSN is calculated by a sector number per block of the flash memory. A PBN that is the physical block number corresponding to the calculated LBN is determined by referring to a mapping table between the LBN and the PBN. Another method of determining the PBN also includes a method of storing logical physical block mapping information by writing the LBN in a certain area per each block of the flash memory, and finding the PBN corresponding to the LBN.

A method of obtaining a sector address from the found PBN roughly includes two methods: a method of obtaining the sector address under the assumption that the sector offset is the same between the logical block and the physical block, and a method in which no match between sector offsets is required by storing new mapping information. Since the former has been already suggested in the prior art, the latter is applied to large block flash memory in accordance with the present invention. Specifically, it is divided into a total of six methods. The first and second methods are page mapping, the third and fourth methods are sector mapping to which page mapping is applied, and the fifth and sixth methods are sector-mapping methods having no page mapping. For the page mapping, LPN should be written as in FIG. 6 and for the sector mapping, LSN should be written as in FIG. 6.

Figure 7:
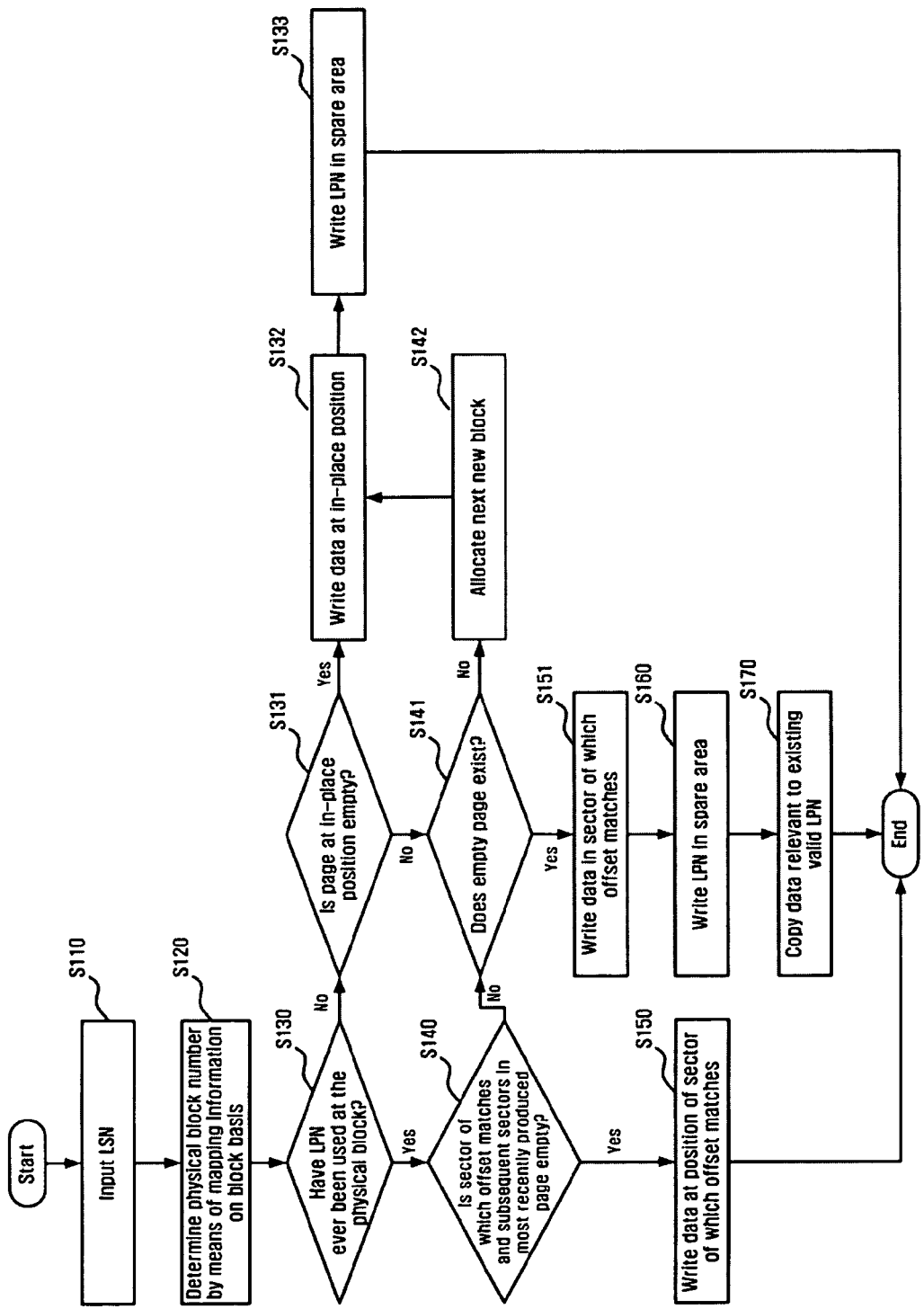
FIG. 7 is a flowchart illustrating a one-to-one page mapping process according to the present invention.

The first method is a one-to-one page mapping method in which there is only one physical address corresponding to one logical address. FIG. 7 is a flowchart illustrating a one-to-one page mapping process according to the present invention. First, the LSN of at least one sector to be handled is input from an external host 300 (S110). LPN and LBN are calculated from the LSN, and PBN is determined using mapping information on a predetermined block basis (S120). A physical block relevant to the determined PBN is subjected to the following process. First, it is determined whether the relevant LPN has been ever used at the physical block (S130). For application to a large block flash memory, it is predefined that specific sectors are included in a specific page using the concept for a page suggested in the present invention. Accordingly, the relevant LPN means the LPN of the page including the LSN as defined above.

In a one-to-one page-mapping scheme, since one physical page number (PPN) is determined for one LPN, it is required to check as to whether input data can be written to the determined PPN. If it is determined in S130 that the LPN has not ever been used, whether a page at an in-place position is empty is determined (S131). If the page is empty, data are written to the in-place position (S132), the LPN is written to a spare area of a page relevant to that position (S133) and the process ends. The in-place position refers to a default position prescribed by existing physical-logical mapping information. That is, it means a position that is prescribed so that a sector having a specific LSN is written to an offset of a page having a specific LPN according to predetermined mapping information.

Thus, the data are basically written to its own in-place position, but when other data have been already written and accordingly, are not written in the in-place position, it suffices that the other data are sequentially written from an upper page or a physical page with a lower-numbered physical page number to the empty physical page.

If it is determined in S130 that the LPN has been used, when there are a number of pages having a valid LPN, namely, pages having the used LPN, determination is made as to whether a sector of which the offset matches and subsequent sectors in a most recently produced page are empty (S140). If so, data are written to the position of the sector of which the offset matches (S150), and the process ends. Here, the offset means a position adapted to be occupied a sector in one page. For example, if it is predefined that D4, D5, D6 and D7 are written in sequence to any page, the D4, D5, D6 and D7 will have 0, 1, 2 and 3 as their offset values, respectively.

In the present invention, in order to obtain high performance in a multiple sector write operation, even though relevant sectors are empty, data are not written to the relevant sectors as long as all of the next sectors in the page are not empty. The reason is because most write requests are for successive sectors, and thereafter while the sector is not empty, performing a write operation for a relevant sector and then requesting another request to successive sectors requires costly update operations. However, in the case of a multiple sector operation, there may be an application specifying, in advance, whether how many sectors are used. In this case, since it is not required that all subsequent sectors are necessarily empty, it may suffice to determine only whether there exist sectors of which the offsets match in S140.

If it is determined in S131 that the page at the in-place position is not empty, it is determined whether an empty page exists in the current block (S141). If an empty page does not exist, the next new block is allocated (S142) and then data are written to the in-place position of the new block (S132). LPN is written to the spare area in the page relevant to the position (S 133) and the process ends.

If it is determined in S141 that the empty pages exist, one page of the empty pages is selected, data are written to a position of a sector of which the offset matches the LSN (S151), and LPN is written to a spare area of the selected page (S160). Selecting one of the empty pages can be made in several methods. That is, empty pages may be sequentially selected from an upper page, and vice versa. Finally, copy is conducted for data relevant to an existing valid LPN to maintain the one-to-one page mapping (S170), and thereafter, the process ends.

Figure 8:
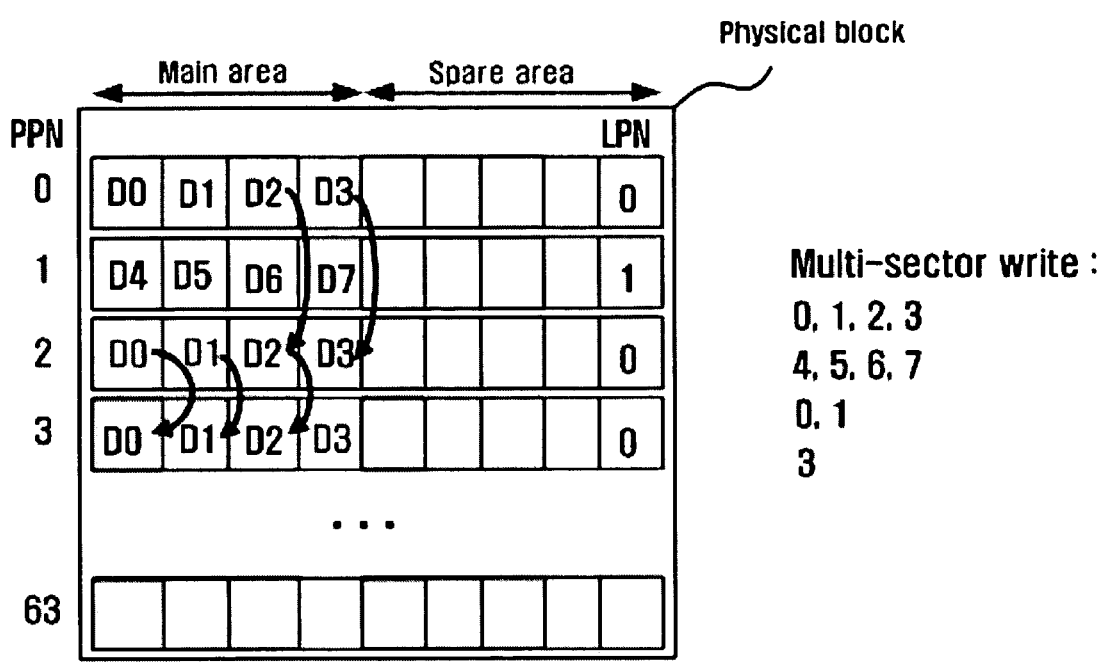
FIG. 8 is a diagram illustrating a practical example of a one-to-one page mapping method according to the present invention.

FIG. 8 illustrates a practical example of a one-to-one page mapping method according to the present invention. Since a large block flash memory is capable of a multi-sector write operation, it is assumed that four data can be concurrently written to the memory. First of all, four data D0, D1, D2 and D3 are written in sequence to a first page (PPN=0) of the current block (S132) and 0 is written to the spare area as an LPN value (S133). Then, another four data D4, D5, D6 and D7 are written in sequence to the second page (PPN=1) (S132) and 1 is written to the spare area as an LPN value (S133). Subsequently, when D0 and D1 should be written, it is determined whether a sector having a relevant offset is empty in the first page (PPN=0) having a valid LPN since the relevant LPN '0' has been written (the example of S130) (S140). Since the sector is not empty, D0 is written to a first sector of the next empty page (PPN=2), D1 is written to a second sector (S151), and the relevant LPN '0' is written to the spare area (S160). Also, remaining data relevant to the existing valid LPN (remaining data written to PPN=0), namely, D2 and D3 are copied to the current page (PPN=2) according to the offset (S170).

Next, when D3 should be written, D3 is written to the position of a sector of which the offset matches in a subsequent empty page (PPN=3), namely, to a fourth sector (S151) and the relevant LPN '0' is written (S160). Thereafter, remaining data from the third page (PPN=2), namely, D0, D1, and D2 are copied to the current page (PPN=3) according to their offsets.

Figure 9:
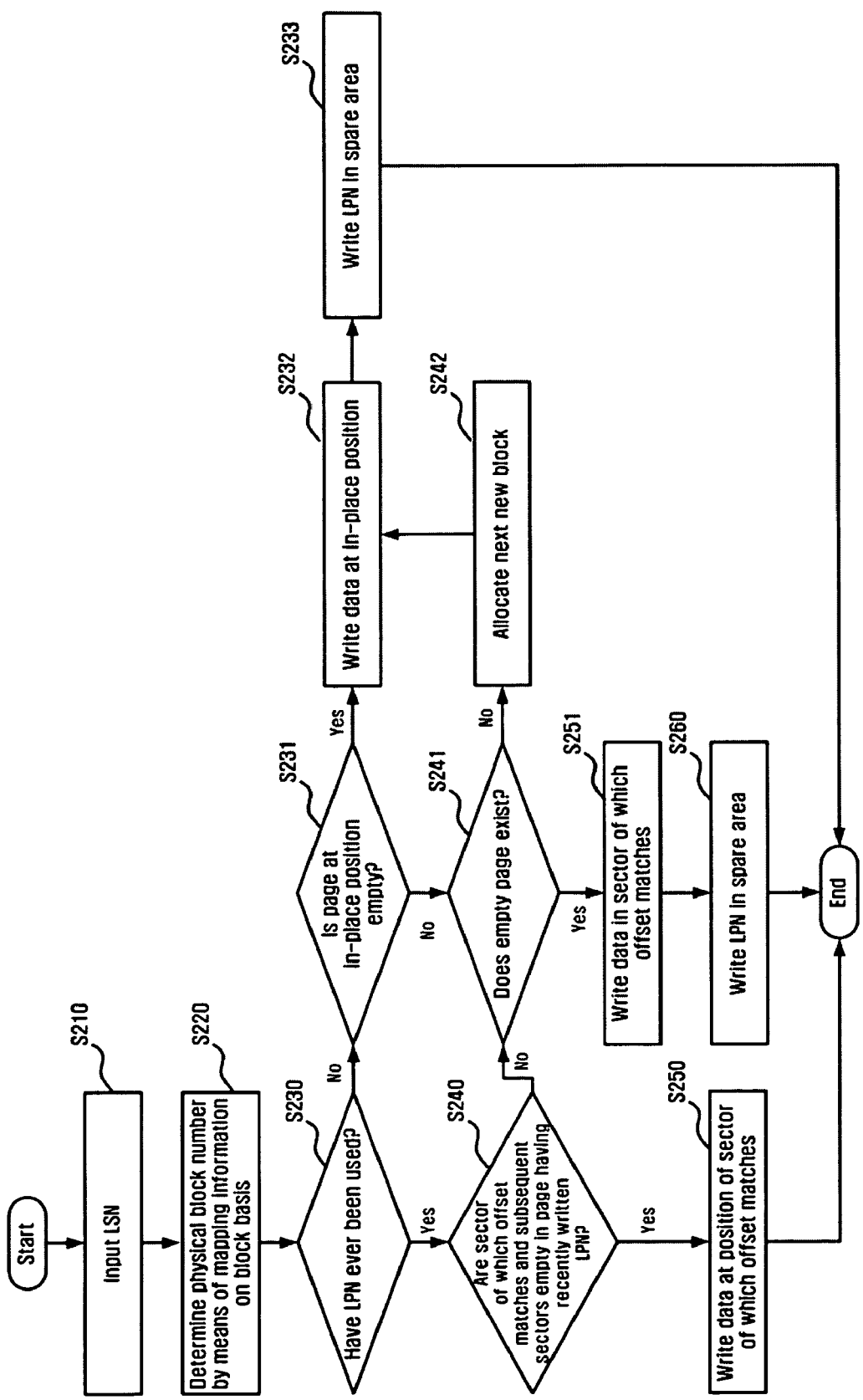
FIG. 9 is a flowchart illustrating a one-to-n page mapping process according to the present invention.

The second method is a one-to-n page mapping method. The flowchart of the method is shown in FIG. 9. This mapping method is a method allowing at least one valid page to be in one block, unlike the first method. That is, a write operation is performed to a physical address with a sector offset of the relevant LSN maintained, but there is no step of copying the remaining sectors from the existing valid page. That is, because in the present method, valid data may be in at least one page, a step is unnecessary in which data for the existing valid LPN is copied. Thus, as compared to the above flowchart of FIG. 7, although the remaining steps are all the same, there is difference only in that there is no step similar to step S170 of FIG. 7.

Figure 10:
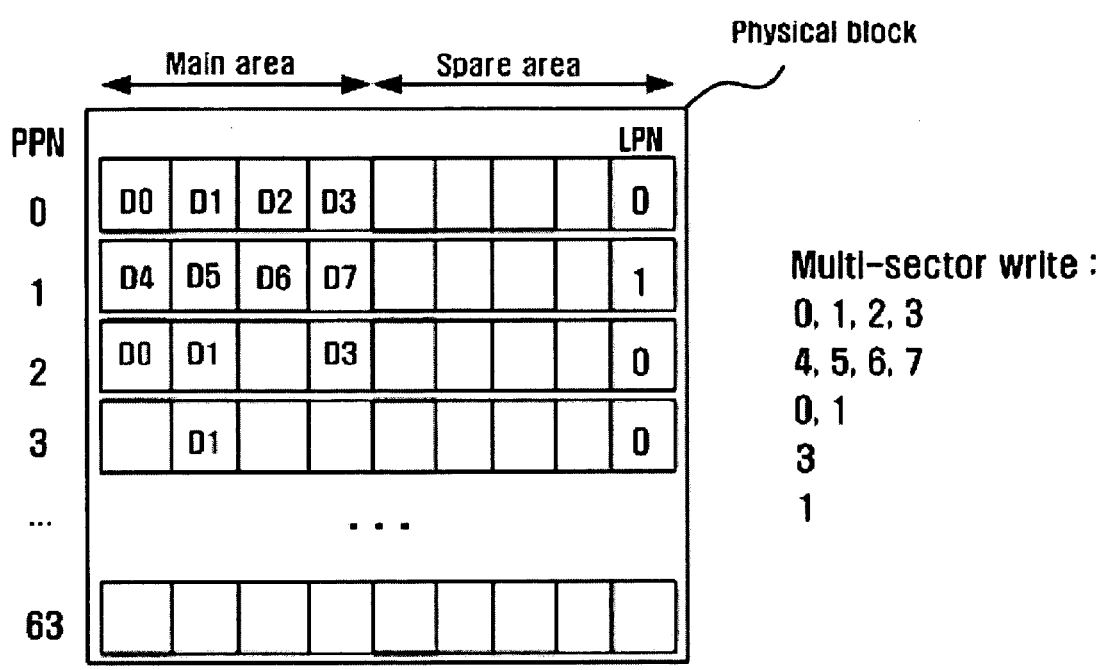
FIG. 10 is a diagram illustrating a practical example of a one-to-n page mapping method according to the present invention.

FIG. 10 illustrates a practical example of a one-to-n page mapping method according to the present invention. First, four data D0, D1, D2 and D3 are written in sequence to the first page (PPN=0) of the current block (S232) and 0 as an LPN value is written to the spare area (S233). Four data D4, D5, D6 and D7 are then written in sequence to the second page (PPN=1) (S232) and 1 as the LPN value is written to the spare area (S233). Subsequently, when D0 and D1 should be written, it is determined whether a sector having the relevant offset is empty in the first page (PPN=0) having the recently written LPN (S240) since the relevant LPN '0' has been written (the example of S230). Since the sector is not empty, D0 is written to a first sector of the subsequent empty page (PPN=2) and D1 is written to a second sector thereof (S251). The relevant LPN '0' is written to the spare area (S260).

When D3 should be then written, D3 is written to a fourth sector since it is determined in S240 that the fourth sector of which the relevant offset matches is empty in the current page (PPN=2) (S250). Thereafter, when D1 should be written, since a sector of which the offset matches is not empty in the page (PPN=2) having the recently written LPN (No in S240), D1 is written to a second sector of which the offset matches in the next empty page (PPN=3) (S251), the LPN is written to the spare area of the page (S260), and then the process ends.

Figure 11:
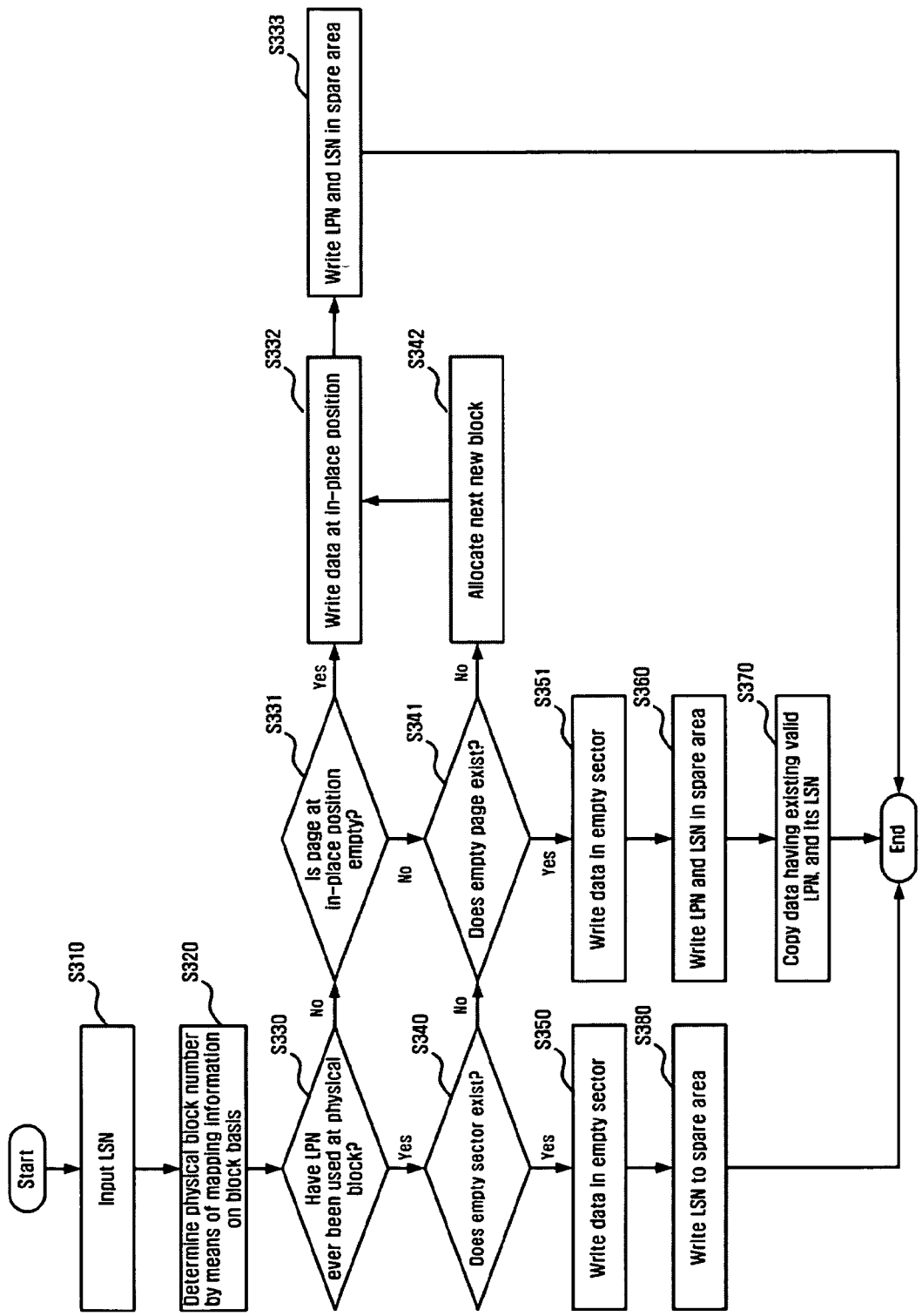
FIG. 11 is a flowchart illustrating a sector mapping method to which a one-to-one page mapping is applied.

A third method is a sector mapping method to which a one-to-one page mapping is applied according to the present invention. The third method is similar to the first one-to-one page mapping method, but is a method of freely writing in a page without maintaining a sector offset upon writing. That is, it is a manner in which data are written without maintaining the sector offset, but remaining sectors are copied from an existing valid page after writing to the relevant page is completed so that only one valid page exists in one block. FIG. 11 is a flowchart illustrating a sector mapping method to which a one-to-one page mapping is applied. Since the sector offset is not maintained unlike the one-to-one page mapping of FIG. 7, it is required to store an LSN indicating mapping information on a sector basis. At this time, the LSN and LPN are concurrently written along with the relevant data.

First, the LSN of at least one sector to be handled is input from an external host 300 (S310). LPN and LBN are calculated from the LSN, and PBN is determined using predetermined mapping information on a block basis (S320). The following process is performed on a physical block relevant to the determined PBN. First, it is determined whether the relevant LPN has ever been used in the physical block (S330).

If it is determined in S330 that the LPN has not been used, it is determined whether a page at an in-place position is empty (S331). If the page is empty, data are written to the in-place position (S332), an LSN is written to a spare area of the page relevant to the position, an LPN is written to a given position of the spare area (S333) and then the process ends. Writing the LSN to the spare area relevant to the position means writing data to a position in spare area corresponding to the position of a sector to which the data are written in a main area of the physical page. For example, it means that if data was written to the first sector, the LSN of the data are written to the first digits of four digits allocated to write the LSN in the spare area.

If it is determined in S330 that the LPNs have been written, it is determined whether an empty sector exists in a page having the most recent one of the written LPNs (S340). If an empty sector exists, data are written to the empty sector (S350) and the LSN of the data are written to a spare area in the page relevant to the position (S380).

If it is determined in S331 that the page at an in-place position is not empty, it is determined whether an empty page exists in the current block (S341). If the empty page does not exist, the next new block is allocated (S342), and then data are written to the in-place position of the new block (S332), the LPN and the LSN are written to the spare area of a page relevant to the position (S333) and the process ends.

If it is determined in S341 that empty pages exist, one of the empty pages is selected and data are written to any empty sector (normally, the first sector) of the page (S351), and the LPN and the LSN are written to the spare area of the selected page (S360). Finally, in order to maintain the one-to-one page mapping, data having an existing valid LSN and an LSN of the data are copied (S370) and then the process ends. The valid LSN means the most recently written one of the same LSNs when the same LSNs exist. In order to find this, when several identical LPNs exist, a page having the most recently written LPN (valid LPN) is retrieved. Since there may be also several identical LSNs in the page, it suffices to find the most recent LSN of the LSNs (the lowest written LSN if the data have been written in sequence).

Figure 12:
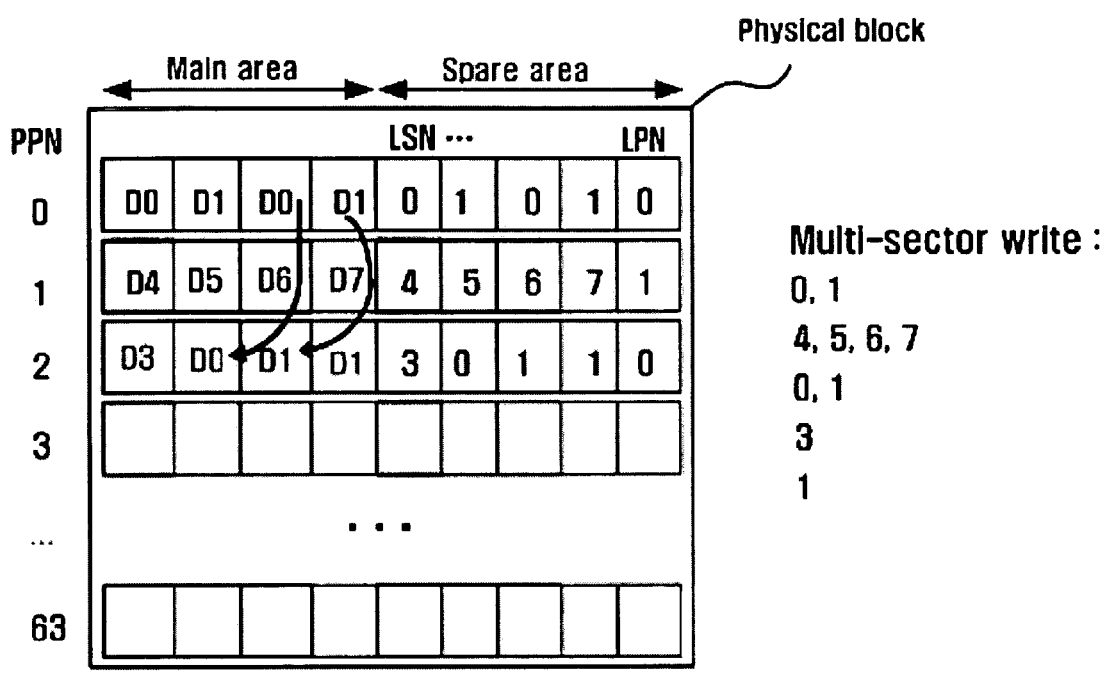
FIG. 12 is a diagram illustrating a practical example of a sector mapping method to which a one-to-one page mapping according to the present invention is applied.

FIG. 12 illustrates a practical example of a sector mapping method to which a one-to-one page mapping according to the present invention is applied. First, two data D0 and D1 are written to a first page of the current block (PPN=0) in sequence (S332), 0 and 1 are written to first and second digits of four digits where LSN of a spare area of the page is written, respectively, and 0 is written to a portion where the LPN is written (S333). Four data D4, D5, D6 and D7 are written to a second page (PPN=1) in sequence (S332), 4, 5, 6 and 7 are written to the spare area as LSNs, respectively, and 1 is written as an LPN value (S333).

Subsequently, if D0 and D1 should be written, it is determined whether an empty sector exists in the page (PPN=0) having the LPN since the relevant LPN '0' has been written (the example of S330) (S340). Since there are two empty sectors, D0 and D1 are written to the empty sectors, respectively (S350), 0 and 1 are written to third and fourth digits among portions where an LSN of the spare area is written, in conformity with the positions of the written D0 and D1, respectively (S380).

If D3 must be then written, D3 is written to an empty sector of the next empty page (PPN=2), namely, the first sector (S351) and the relevant LSN '3' and the relevant LPN '0' are written (S360). Thereafter, valid D0 and D1 (refer to the most recently written D0 and D1) from the first page (PPN=0) are copied to empty sectors of the current page (PPN=2). 0 and 1 as LSNs of D0 and D1 are copied to the relevant position, namely, to the second and third digits of a portion where LSNs of the spare area are written (S370). Next, if D1 should be written, since an empty sector exists in the current page (PPN=2) (the example of S340), D1 is written to the sector (S350) and 1 is written to a position to which the relevant LSN is written (S380).

Figure 13:
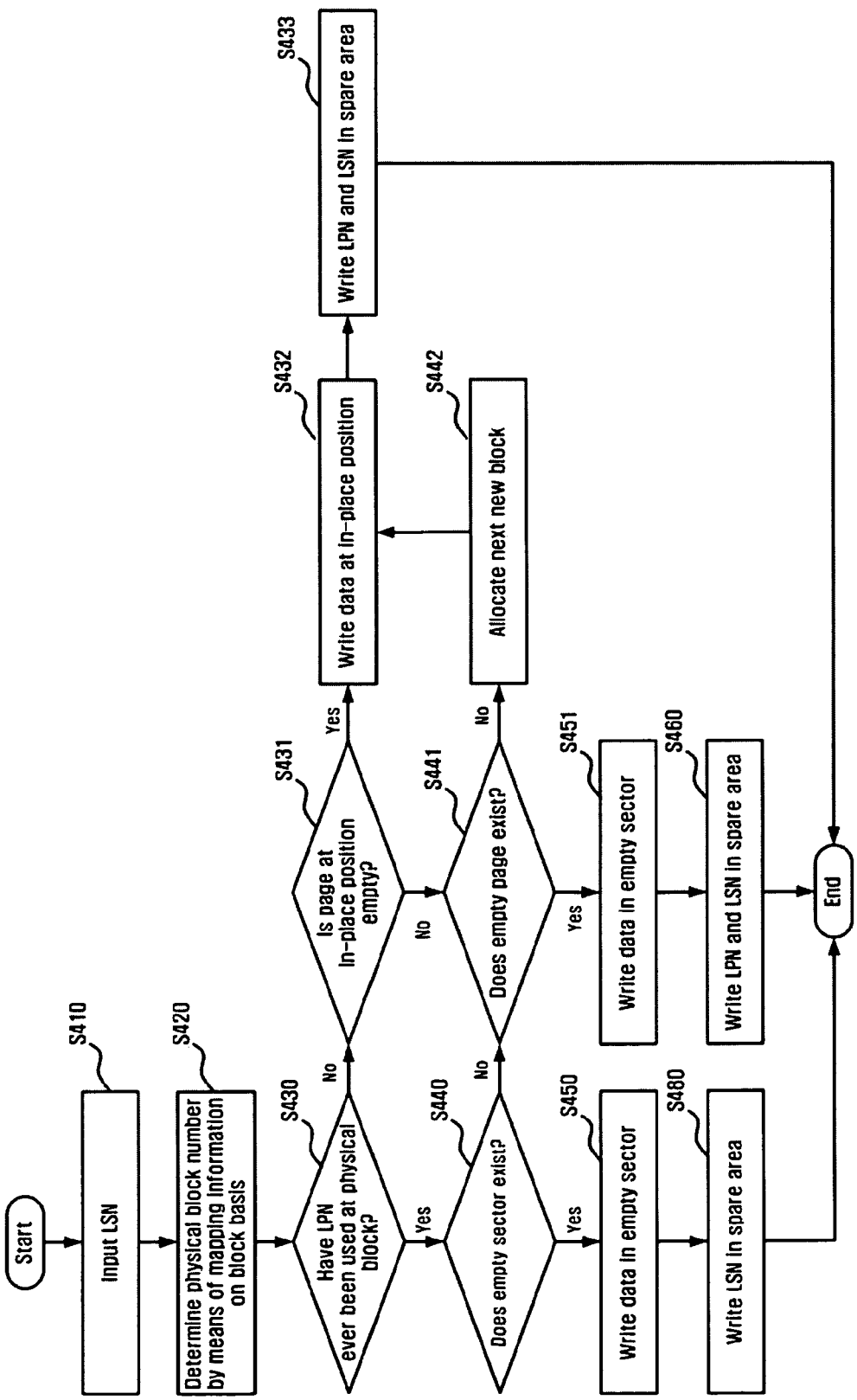
FIG. 13 is a flowchart illustrating a sector mapping method to which a one-to-n page mapping according to the present invention is applied.

The fourth method is a sector mapping method to which the one-to-n page mapping is applied according to the present invention. It is similar to the second suggested method, but there is a difference in that a write operation is also freely made in the page without maintaining a sector offset during writing. The two methods, however, are similar to each other in that at least one page having a valid sector may be present in one block. When a write operation is made in the page, once data are written to a position of which the sector offset matches and, if the data are already present in the digit, empty sectors can be found from the left to write data, and vice versa. FIG. 13 is a flowchart illustrating a sector mapping method to which a one-to-n page mapping is applied. As compared to the flowchart of FIG. 11, although the remaining steps are all the same, there is difference only in that a step similar to step S370 of FIG. 11 does not exist.

Figure 14:
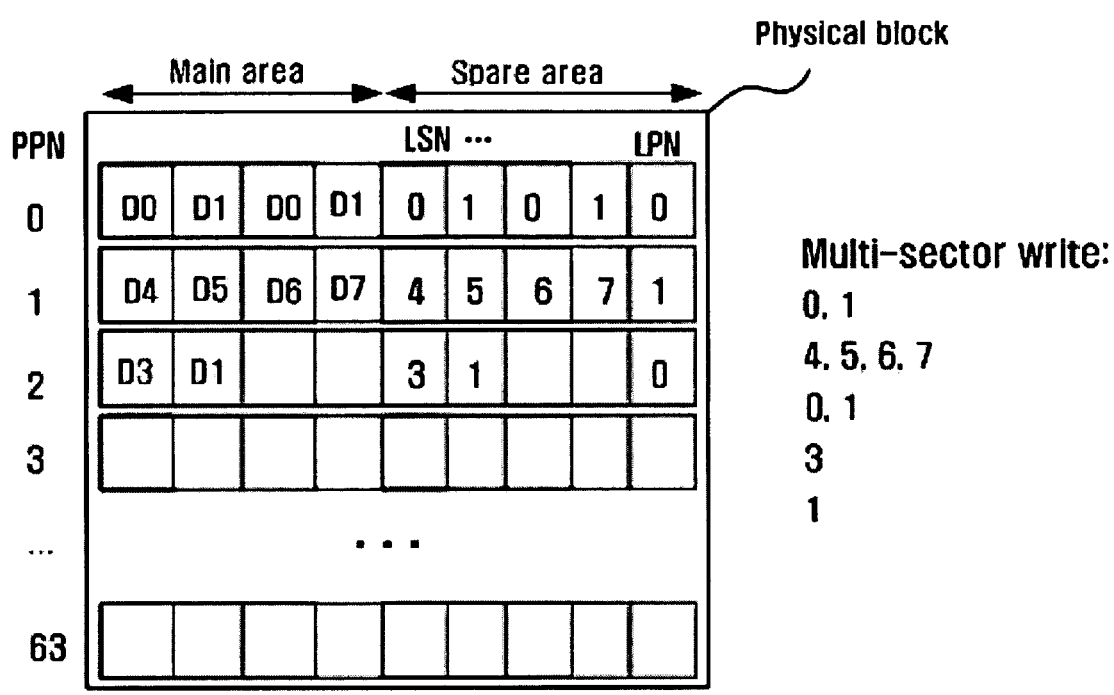
FIG. 14 is a diagram illustrating a practical example of a one-to-n page mapping method according to the present invention.

FIG. 14 illustrates a practical example of a one-to-n page mapping method according to the present invention. First, two data D0 and D1 are written to a first page in the current block (PPN=0) in sequence (S432). 0 and 1 are written to first and second digits of four digits to which an LSN of a spare area of the page is written, respectively, and 0 is written to a portion to which an LPN is written (S433). Next four data D4, D5, D6 and D7 are written to a second page (PPN=1) in sequence (S432), and 4, 5, 6 and 7 are written to the spare area as LSN values, respectively, and 1 is written as the LPN value (S433).

Next, if D0 and D1 should be written, since the relevant LPN '0' has been written (the example of S430), it is determined whether empty sectors exist in the page (PPN=0) having the LPN (S440). Since two empty sectors exist, D0 and D1 are written to the empty sectors (S450). 0 and 1 are written to third and fourth digits in portions in the spare area where the LSN is written in conformity with positions of the written D0 and D1, respectively (S480).

If D3 should be then written, D3 is written to an empty sector in the next empty page (PPN=2), namely, a first sector (S451) and a relevant LSN '3' and a relevant LPN '0' are written (S460). If D1 should be then written, since an empty sector exists in the current page (PPN=2) (the example of S340), D1 is written to the second sector in the current page (PPN=2) (S450) and 1 is written to a position where a relevant LSN is written (S480).

Figure 15:
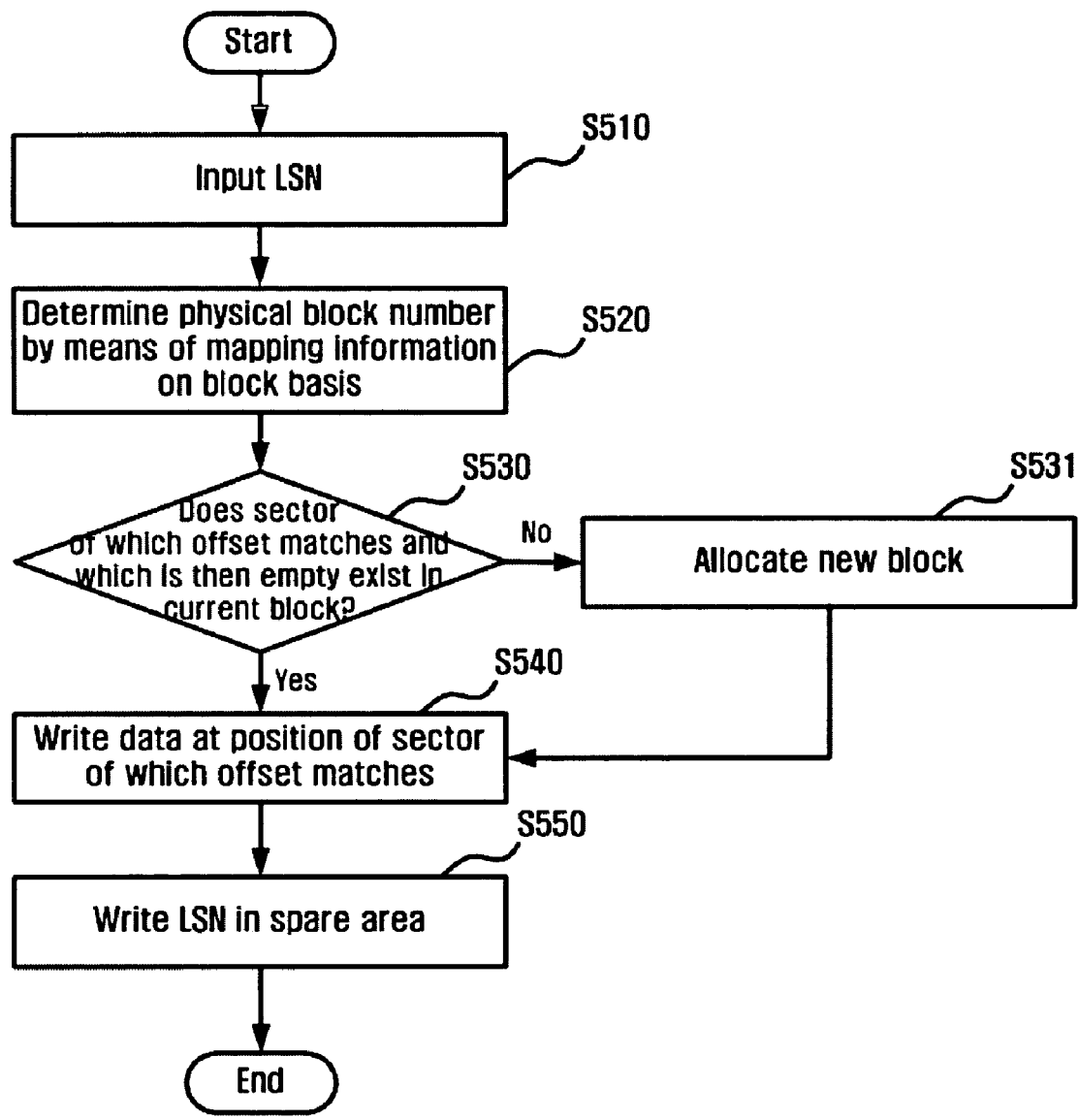
FIG. 15 is a flowchart illustrating an offset matched sector mapping method according to the present invention.

Since fifth and sixth suggested methods are sector mapping methods having no page mapping, it is not required to write an LPN in a spare area of a page. FIG. 15 is a flowchart illustrating an offset matched sector mapping method as the fifth method according to the present invention. This method is a method of finding an empty sector and writing data thereto while maintaining only a sector offset.

First, an LSN of at least one sector to be handled is input from an external host 300 (S510). LPN and LBN are calculated from the LSN, and a PBN is determined using predetermined mapping information on a block basis (S520). The following process is performed on a physical block relevant to the determined PBN. Determination is first made as to whether a sector of which the offset matches and which is then empty exists in the current block (S530). If it is determined in S530 that the empty sector exists, data are written to a position of the sector of which the offset matches (S540), the LSN of the data are written to a relevant position of a portion where an LSN of a spare area in the current page is written (S550), and the process ends. If it is determined in S530 that the empty sector does not exist, a new block is allocated (S531) and then S540 and S550 are performed, which terminates the process.

Figure 16:
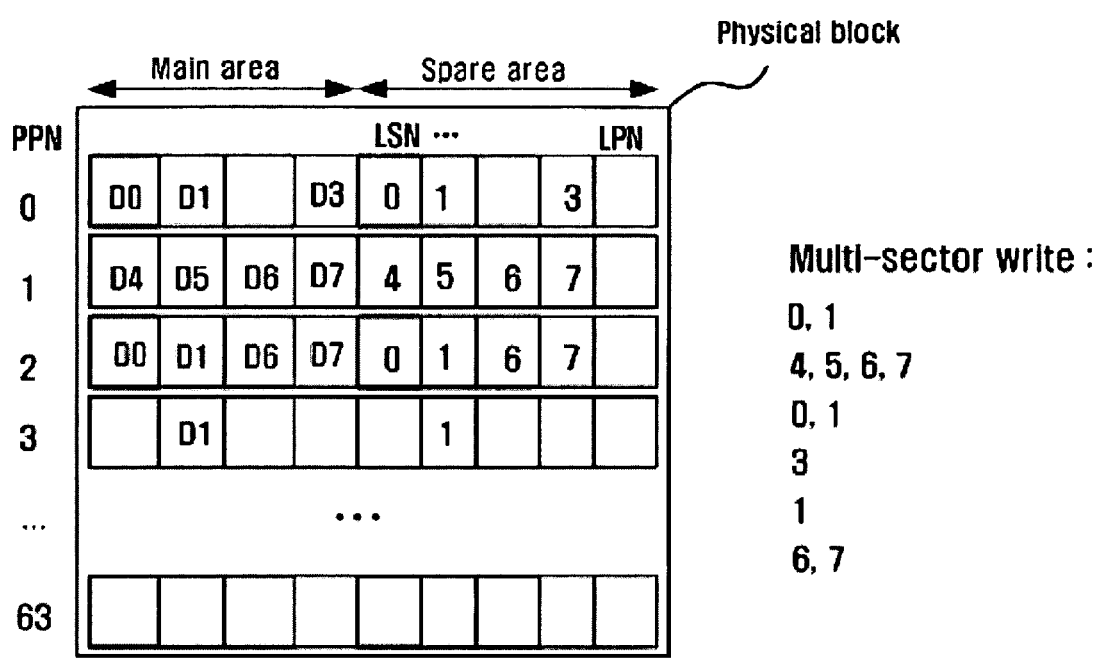
FIG. 16 is a diagram illustrating a practical example of an offset matched sector mapping method according to the present invention.

FIG. 16 illustrates a practical example of an offset matched sector mapping method according to the present invention. D0 and D1 are first written to first and second sectors of a first page (PPN=0), respectively (S540), and 0 and 1 are written to relevant digits of a portion in the spare area to which the LSN is written (S550). Next, if D4, D5, D6 and D7 are to be written, since there is no space to write four sectors in the first page (PPN=0), the four sectors are written to the next page (PPN=1) (S540) and 4, 5, 6 and 7 as relevant LSNs are written thereto, respectively (S550). Next, if D0 and D1 are to be written, D0 and D1 are written to an empty page (PPN=2) in offsets of D0 and D1 (S540), and 0 and 1 as the relevant LSNs are written therein, respectively (S550).

Next, if D3 is to be written, D3 is written to an empty page (PPN=0) in offsets of D3 (S540), and 3 as the relevant LSN is written (S550). Thereafter, if D1 is to be written, D1 is written to an empty page (PPN=3) in an offset of D1 (S540), and 1 as a relevant LSN is written thereto (S550).

Finally, if D6 and D7 are to be written, D6 and D7 is written to the page (PPN=2) of which the third and fourth sectors are empty, the third and fourth sectors being offsets of D6 and D7 (S540), and 6 and 7 as the relevant LSNs are written (S550).

Figure 17:
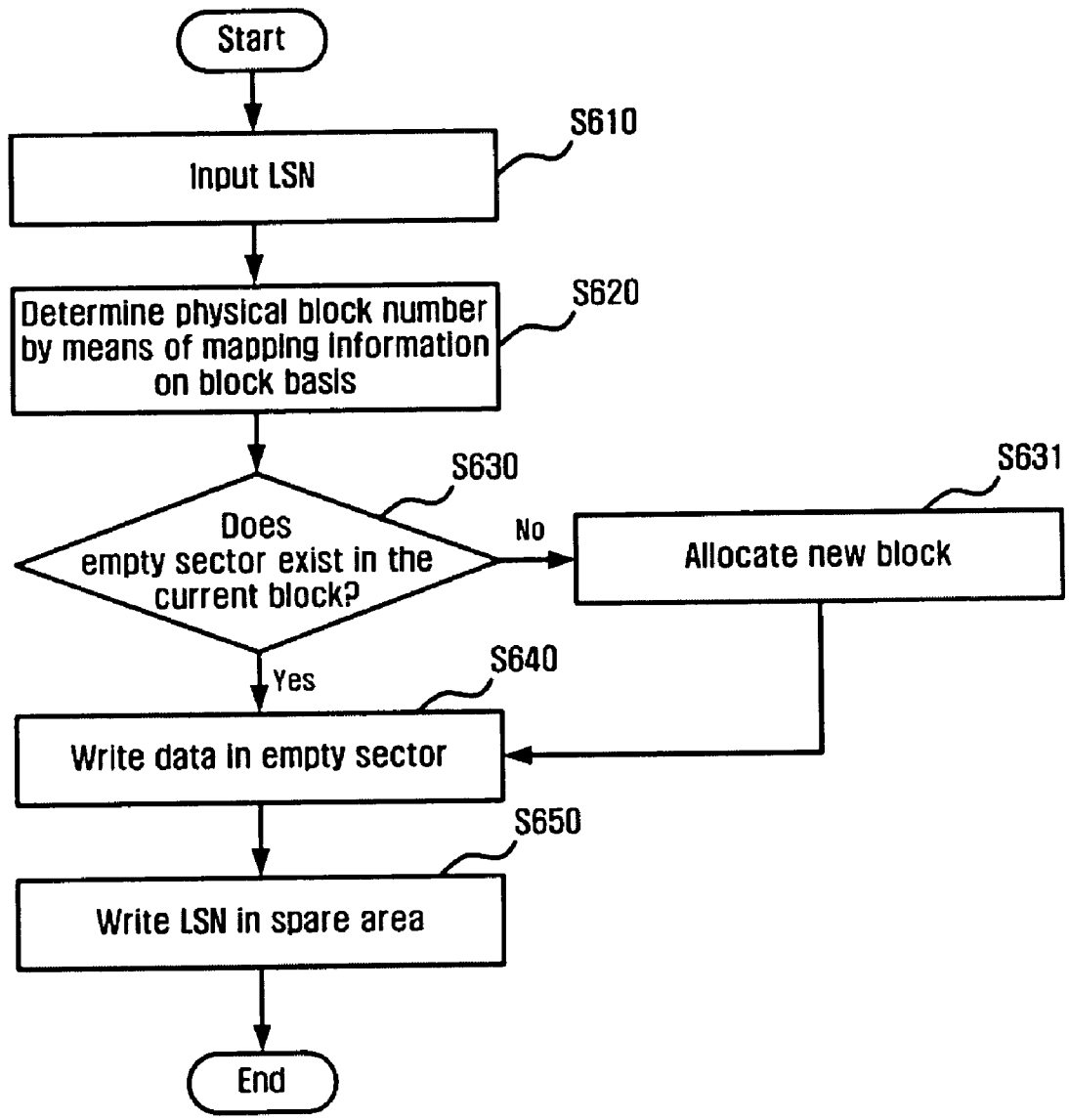
FIG. 17 is a flowchart illustrating an offset mismatched sector mapping method according to the present invention.

FIG. 17 is a flowchart illustrating an offset mismatched sector mapping method as a sixth method. This method is a method of writing data to empty sectors in sequence regardless of both the page and the sector offset.

First, LSN of at least one sector to be handled is input from an external host 300 (S610). LPN and LBN are calculated from the LSN, and PBN is determined using predetermined mapping information on a block basis (S620). The following process is performed on a physical block relevant to the determined PBN. First, it is determined whether an empty sector exists simply without considering the offset in the current block (S630). If it is determined in S630 that the empty sector exists, data are written to the empty sector (S640), and the LSN of the data are written to a relevant position in a portion to which LSN of a spare area of the current page is written (S650), which terminates the process. If it is determined in S630 that the empty sector does not exist, a new block is allocated (S631) and then S640 and S650 are performed, which terminates the process.

Figure 18:
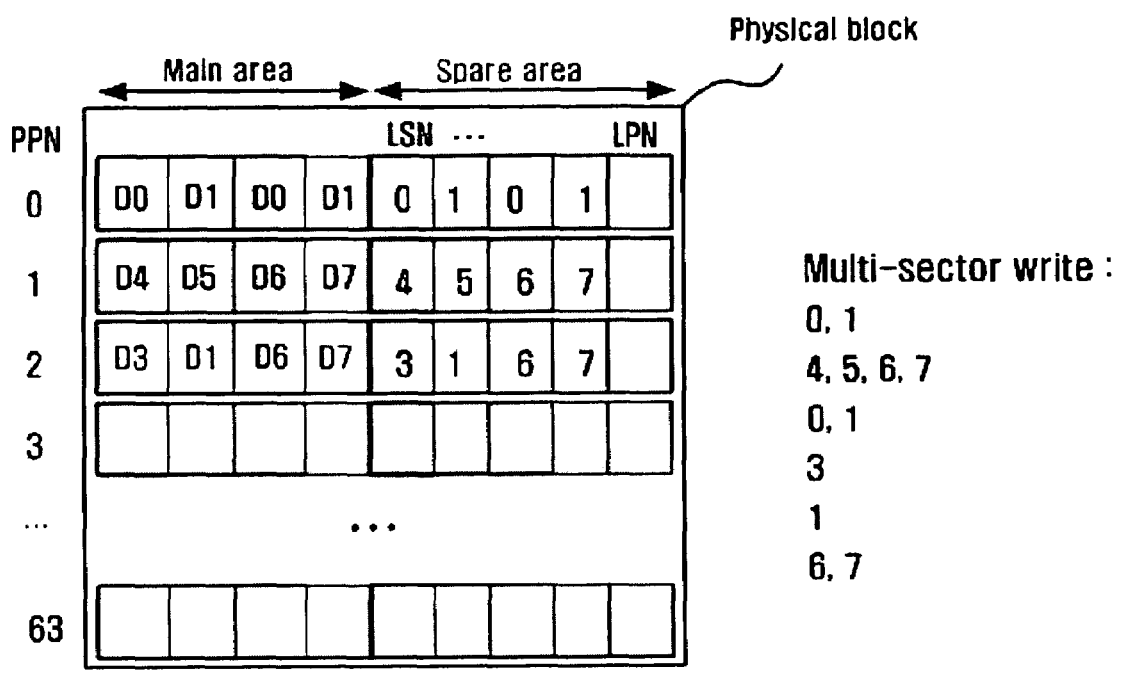
FIG. 18 is a diagram illustrating a practical example of an offset mismatched sector mapping method according to the present invention.

FIG. 18 illustrates a practical example an offset mismatched sector mapping method according to the present invention. First, D0 and D1 are written to the first and second sectors of a first page (PPN=0), respectively (S640), and 0 and 1 are written to relevant digits in a position to which the LSN of the spare area is written (S650). Next, if D4, D5, D6 and D7 are to be written, since there is no space to write four sectors in the first page (PPN=0), the four sectors are each written to the next page (PPN=1) (S640) and 4, 5, 6 and 7 as relevant LSNs are written thereto (S650). Next, if D0 and D1 are to be written, D0 and D1 are written to the first page (PPN=0) of which two sectors are empty (S640), and 0 and 1 as the relevant LSNs are written thereto (S650).

Next, If D3 is to be written, since a first page (PPN=0) and a second page (PPN=1) have no empty sectors, D3 is written to a first sector of the next page (PPN=2) (S640), and 3 as a relevant LSN is written thereto (S650). Thereafter, if D1 is to be written, D1 is written to the second sector of the page (PPN=2) (S640), 1 as a relevant LSN is written (S650). Finally, if D6 and D7 are to be written, since two sectors in the page (PPN=2) is yet empty, D6 and D7 are written to the third and fourth sectors of the page (S640), and 6 and 7 as relevant LSNs are written (S650).

The six manners have been suggested so far as methods of efficiently writing data to the large block flash memory capable of a multi-sector write according to the present invention. Since the flash memory allows I/O on a page basis, in case of the multiple sector write operation, sectors are buffered using a buffer of the flash memory and the write operation for two or more sectors can be performed in once flash write operation.

A read algorithm corresponding to such a write method is performed in the reverse order of the write algorithm. In the page mapping of the first and second methods, since a physical sector offset matches sector offset of the logical address, it suffices to find one page in which a sector requested for read is positioned, and then to read data in the offset of the input sector. At this time, in the second method, since one or more valid pages exist, up-to-date data are found in the reverse order of the write algorithm.

In the third and fourth methods, once a relevant page is found, LSN is retrieved to find a relevant sector. At this time, if two or more identical LSNs exist, a valid sector is found in the reverse order of the write algorithm.

In the fifth method, it suffices to find a valid sector in the reverse order of the write algorithm since the sector offsets match. In the sixth method, which finds a valid sector based on the LSN value, similarly, it suffices to find the valid sector in the reverse order of the write when at least one LSN exists.

Logical-physical Mapping Information Managing Method

Hereinafter, the operation of a method for storing and managing logical-physical mapping information in a flash memory will be discussed. It should be noted that this scheme can be particularly applied to a small block flash memory as well as a large block flash memory.

Figure 19A:
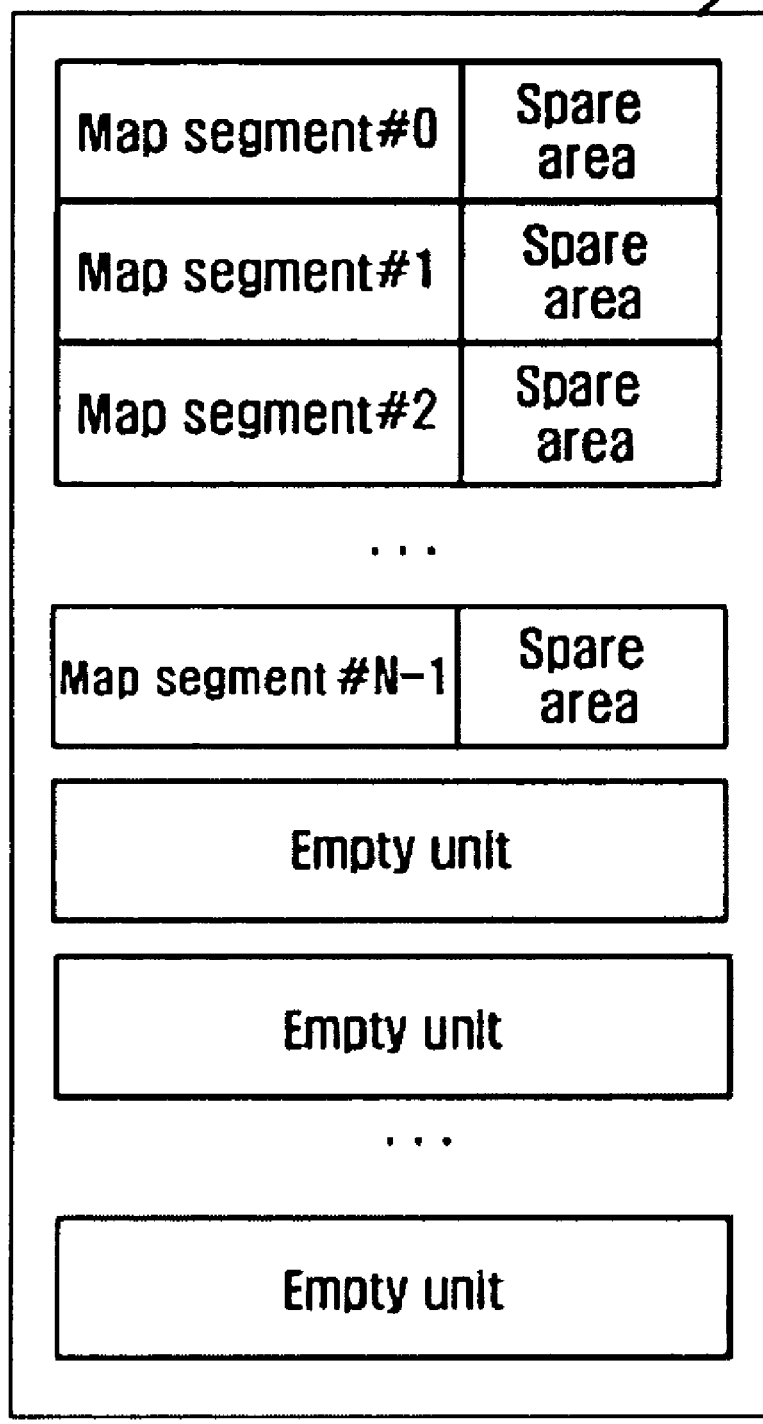
FIG. 19A is a diagram illustrating the relationship between a map block and a map segment.

FIG. 19A shows logical-physical mapping information divided into segments (or pieces) of a predetermined size. One unit obtained by summing one map segment and one spare area is defined as a map segment unit. The size of one map segment may be equal to that of the main area in the page of the flash memory. Several segments may be included in the main area of the page of the flash memory. One segment may be stored in the main areas of several pages in the flash memory. Since updating all of the mapping information when some of the mapping information should be updated may degrade system performance, the mapping information is divided into segments of a predetermined size to update only segments which are needed.

Figure 19B:
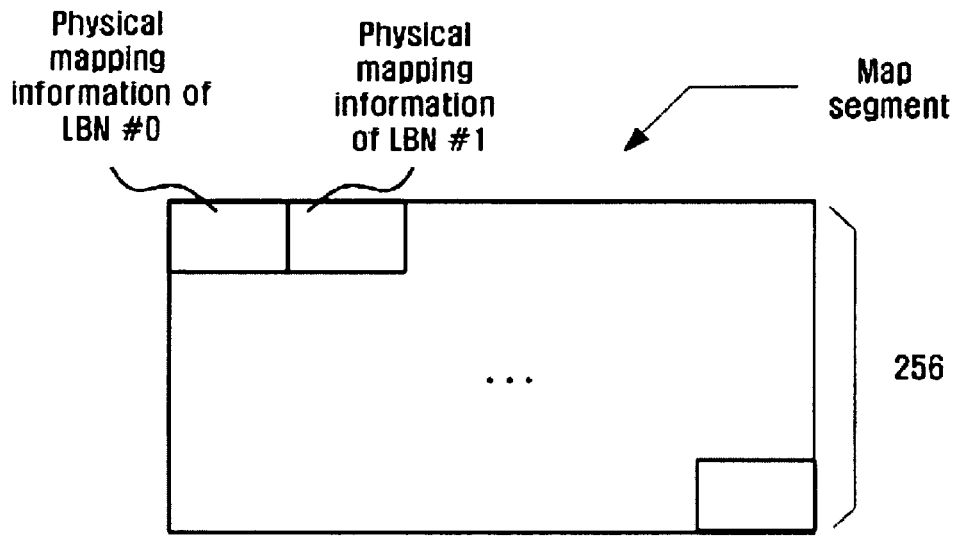
FIG. 19B is a diagram illustrating an example of information stored in the map segment.
Figure 19C:
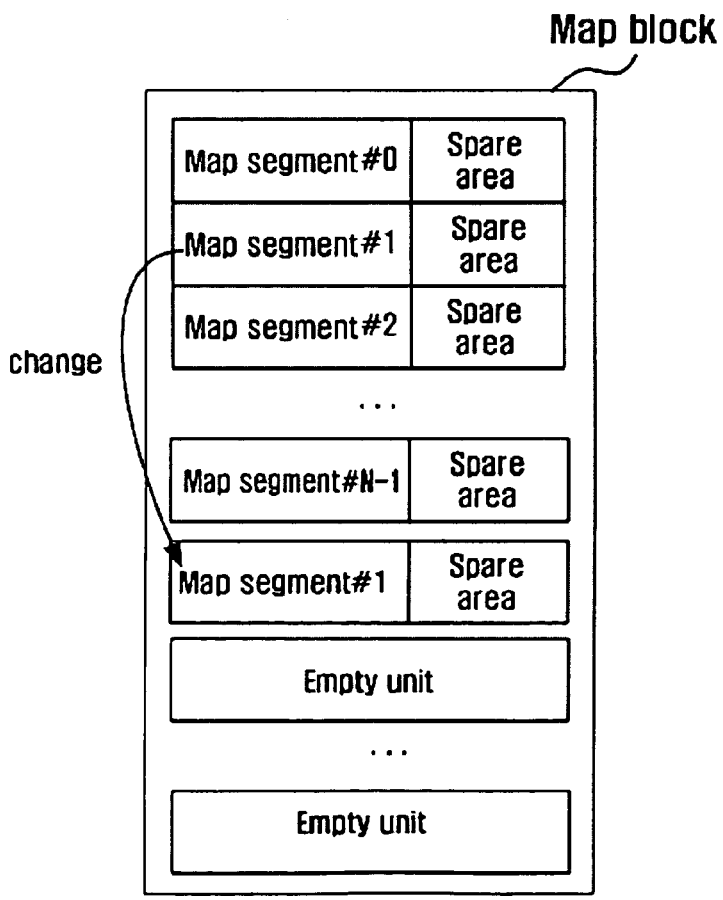
FIG. 19C is a diagram illustrating an operation when a map segment is modified.

As shown in FIG. 19B, assuming that the size of a map segment is equal to that of the main area of the page and 2 bytes are required for the logical-physical mapping information of one block, since the small block flash memory has a main area of 512B per one page, mapping information for 256 blocks can be stored in one map segment. Since one block has 32 pages, 32 map segment units can be stored in one map block. Accordingly, if the entire logical-physical mapping information can be divided into and stored in N map segments, 32-N empty units will exist. While N map segment units are initially written as in FIG. 19A, modification of the mapping information occurs. If the modification occurs at map segment #1, it will suffice to write the modified map segment #1 to the next empty unit, as in FIG. 19C. If a number of map segments having the same map segment number (#) exist in one block, it is determined that only the most recently written map segment is valid.

Each map segment unit has a spare area having additional information pertaining to the map segment in addition to the map segment. In the small block flash memory, 16 bytes may be used for the spare area. The logical-physical mapping information may be the mapping information on a block basis, as described above. It is not limited to the mapping information on the block basis or may be mapping information on a sector basis or mapping information on a page basis in the large block flash memory. That is, the logical-physical mapping information may be mapping information between the logical block number and the physical block number, mapping information between the logical page number and the physical page number, or mapping information between the logical sector number and the physical sector number.

Figure 20:
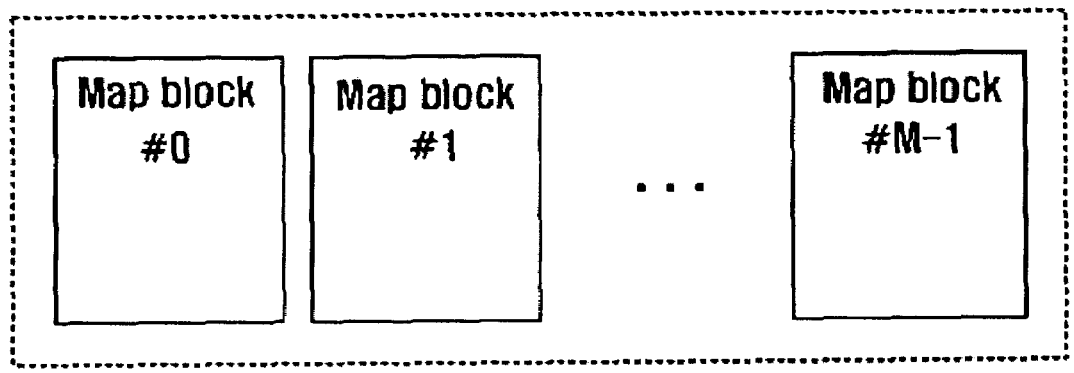
FIG. 20 is a diagram showing a predetermined allocated number of map blocks.

FIG. 20 shows M allocated map blocks. A predetermined number of map blocks (M map blocks) are allocated independently from data blocks in which all logical-physical mapping information can be written. If the size of the mapping information to be written does not exceed one block hereinafter (this case is hereinafter assumed), the operation is possible only with one allocated block. However, in the case of any system in which power can suddenly fail during a write or erase task, it is safe to leave the previous mapping table without erasing it until a newly updated mapping table is completely written. Thus, by allocating two or more blocks, mapping table information can be safely managed even upon sudden power failure.

Figure 21:
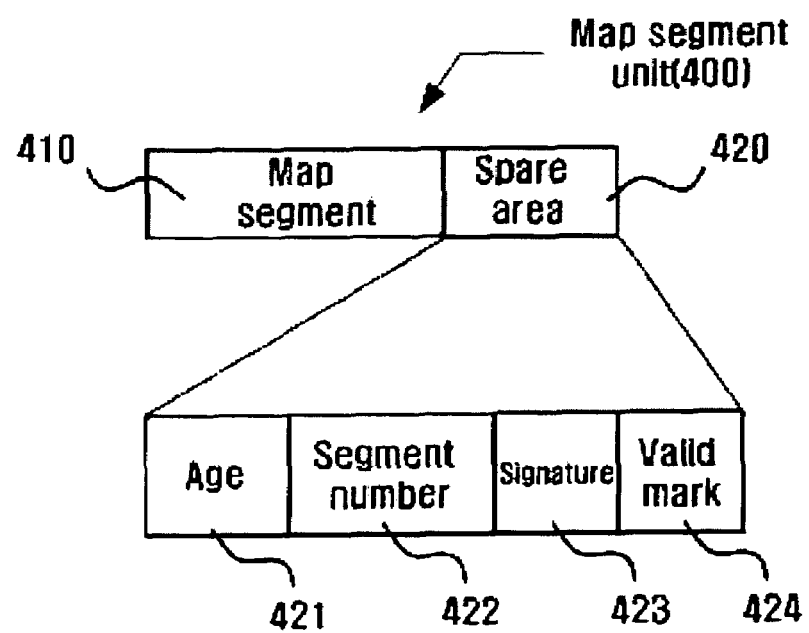
FIG. 21 is a diagram illustrating a configuration of a spare area in a map segment unit according to the present invention.

FIG. 21 shows the configuration of a spare area in the map segment unit 400 according to the present invention. Additional information is written to the spare area 420 in order to safely protect the logical-physical mapping information. The additional information may be composed of an age 421 written with a number increased when a map segment unit pertaining to valid mapping information is copied from an existing map block to a new map block, a segment number 422 indicating a serial number pertaining to a map segment divided and stored, a signature 423 indicating whether an error is present while the map block is erased, and a valid mark 424 indicating that an error is not generated during writing the map segment. They are written together when a map segment is written.

The age 421 is used to find a valid block of several blocks. It suffices that the age is once written per block, but it is assumed in the present embodiment that the age is written to all map segment units in the block. In the case where a map segment 410 pertaining to the mapping information is updated, the map segment is written to the first empty unit in the block along with the map segment number 422 pertaining to the updated mapping information. In the case where an empty unit does not exist any more in the block by means of several updates for the map segment 410, when the next empty map block exists, it is written to the next empty map block, and when no empty map block exists, the map segment 410 relating to valid mapping information of the previous block is entirely moved after an invalid map block is erased, and an age 421 higher than the age 421 of the previous block is written to the new block. Accordingly, a map block having the largest age number 421 is deemed valid.

The following method of finding a valid map segment 410 when the map segment 410 related to the mapping information is updated in the flash memory is as follows. There is only one block in the present invention, the block having a map segment 410 pertaining to the valid mapping information. Accordingly, a map block having the valid mapping information is first found and this block becomes a block of the map blocks having the largest age 421. Since there may exist several map segments 410 having a specific segment number 422 even in the map block having the largest age 421, the most recently recorded map segment 410 among the map segments (the lowest recoded one when the map segment units are sequentially recorded) is selected.

Even though typical data information written to the flash memory is lost in part, remaining portions of the information only allows the user to perform a desired task. In contrast, mapping information contains a lesser amount of information but, if lost, all of the data stored in the flash memory is possibly useless. Accordingly, safe protection of the mapping information is very important. Particularly, since the flash memory is widely used in applications such as embedded systems and mobile devices, power failures frequently occur. Thus, a solution to power failure is necessary. Power failure is of particular importance during write or erase operations. In the present invention, introduction of concepts of a signature 423 and a valid mark 424 is made to discriminate invalid data resulting from power failure. The valid mark 424 is always written after the map segment 410 pertaining to the mapping information has been written. The map segment 410, to which the valid mark 424 is not written, is regarded as an invalid map segment 410 due to a failure to complete the recording process to the end.

Further, in the case of writing the map segment 410, it is written along with given bytes of the signature 423 including at least one bit 0. If the erase operation for the block is completed, the bits in the block are all initialized to 1. Accordingly, the written 0s of the data are all changed to 1s. When power failure occurs during the erase process, some of the bits are changed to 1s while some remain 0s. Thus, even though the valid mark 424 is maintained as it is, the age 421, the signature 423, or the like, including the map segment 410, would be possibly modified. If so, the age 421 of the block that will be erased is modified and unfortunately, there is a possibility that it is modified into a block having the highest age 421. For example, assuming that the age of the map block immediately before erasure was '0000101' in binary numbers, the '0' would be changed to '1' during erasure of the map block such that the age is '1111111'. If this is larger than the age of the valid map block 421, the map block that stops erasure may be erroneously recognized as a valid map block having the largest age 421.

However, when the age 421 has been modified due to a power failure occurring during block erasure, the bit of the signature 423 would be also modified into 1. Accordingly, when the signature does not match, it is regarded as a block in which power failure occurred during the erasure process, thereby solving the aforementioned problems. When such a method is used to identify a power failure during the erase operation, the possibility for discrimination depends on the length of the signature and the number of 0s in the signature.

Finally, in the case where there is no empty unit in the map block, there is a need for a task for moving all of the valid map segment units 400 to a new block. At this time, if a power failure occurs when the valid map segment units 400 are moved to the new block, valid map segments 410 can exist together in two map blocks since the previous block has not been erased. However, according to the present invention, the valid mark 424 is written only after all of the valid map segment unit 400, the age 421, the segment number 422, and the signature 423 are completely written to the new block. Accordingly, even when a power failure occurs while the map segment unit 400 is moved to the new block, it is regarded that even a map block that is likely to have up-to-date mapping information is invalid by the age 421 or the like since the valid mark 424 does not exist in the new map block when searching for a valid map block. Accordingly, such a map block is initially excluded from the process of finding the valid map block. Meanwhile, since the previous map block remains as it is without being erased, it is selected as a valid map block. Thus, the up-to-date mapping information can be safely managed.

According to the present invention, there is an advantage in that the performance of the large block flash memory can be enhanced and the system can be safely recovered even upon sudden power failure by suggesting a logical-physical address mapping method and a logical-physical address mapping information managing method to which the feature of the large block flash memory is reflected.

Although the embodiments of the present invention have been described with respect to the accompanying drawings, it will be understood by those skilled in the art to which the present invention pertains that the present invention can be implemented in other detailed forms without modifying the technical spirit or essential features of the present invention. Therefore, it should be noted that the embodiments are illustrative at all aspects, not limiting.

What is claimed is:

1. A method for writing data in a flash memory, the flash memory including at least one block having a plurality of physical pages, each page comprising a predetermined number of sectors, and the data being written on a sector basis or a page basis and being erased on a block basis, the method comprising:

a first step of determining whether a first sector is empty in a first physical page of the plurality of the pages having a most recently written logical page number of the data to be written, and an offset of the first sector matches an offset of the data to be written;

a second step of, if it is determined in the first step that the first sector of which the offset matches the offset of the data is empty, writing the data in the first sector of the first physical page; and a third step of, if it is determined in the first step that the first sector of which the offset matches the offset of the data is not empty, selecting an empty second physical page to write the data to a second sector in the selected empty second physical page wherein an offset of the second sector matches the offset of the data to be written, and writing the most recently written logical page number for the data to the selected empty second physical page, wherein, prior to the first step, whether a logical page number of the data to be written has ever been written is determined and, if the logical page number has been written, the first step is performed, and, otherwise, the data and the logical page number of the data is written to a position prescribed by an existing physical logical mapping information.

2. The method as claimed in claim 1, wherein an area to which the data are written is a main area of one of a plurality of physical pages and an area to which the most recently written logical page number is written is a spare area of the one of the plurality of physical pages.

3. The method as claimed in claim 1, wherein the first step concurrently determines whether the first sector of which the offset matches the offset of the data to be written is empty in the first physical page having the most recently written logical page number of the data to be written, and whether all sectors following the first sector in the first physical page are empty, and wherein, in the second step, the data is written in the first sector of the first physical page only if the all sectors following the first sector are empty as a result of the determining in the first step.

4. The method as claimed in one of claims 1, 2 and 3, wherein the data are first data, further comprising:

a fourth step of copying, to the selected empty second physical page, second data other than the first data written in the third step, among a plurality of data written to an existing valid logical page having the most recently written logical page number written in the third step.

5. The method as claimed in claim 4, wherein finding the existing valid logical page when the second data are written in sequence from a lower-numbered physical page is accomplished by finding a highest-numbered physical page of one or more physical pages having the most recently written logical page number.

6. The method as claimed in claim 4, wherein finding the existing valid logical page when the first data are written in an in-place preference manner is accomplished by selecting pages other than a page at an in-place position among one or more physical pages having the most recently written logical page number, and finding a highest-numbered physical page of the selected pages.

7. A method for writing data in a flash memory, the flash memory including at least one block having a plurality of physical pages, each page comprising a predetermined number of sectors, and the data being written on a sector basis or a page basis and being erased on a block basis, the method comprising:

a first step of determining whether an empty first sector exists in a first physical page of the plurality of pages having a most recently written logical page number of the data to be written, the empty first sector being capable of storing the data to be written;

a second step of, if it is determined in the first step that the empty first sector exists, writing the data to the empty first sector in the first physical page and writing a logical sector number for the data to the first physical page; and a third step of, if it is determined in the first step that the empty first sector does not exist, selecting an empty second physical page to write the data to an empty second sector in the selected empty second physical page, and writing the most recently written logical page number and the logical sector number for the data to the selected empty second physical page.

8. The method as claimed in claim 7, wherein writing the logical sector number in the second step and the third step comprises writing the logical sector number to a position of a spare area corresponding to a position of one of the empty first and the empty second sectors in a main area of one of the first physical page and the empty second physical page to which data are written.

9. The method as claimed in claim 7, wherein the data are first data, further comprising:
a fourth step of copying, to the selected empty second physical page, second data other than the first data written in the third step and a logical sector number of the second data among a plurality of data written to an existing effective logical page having the most recently written logical page number written in the third step.

10. The method as claimed in claim 9, wherein finding the existing valid logical page when the second data are written in sequence from a lower-numbered physical page is accomplished by finding a highest-numbered physical page among one or more physical pages having the most recently written logical page number.

11. The method as claimed in claim 9, wherein finding the valid logical page when the first data are written in an in-place preference manner is accomplished by selecting pages other than a page at an in-place position among one or more physical pages having the most recently written logical page number, and finding a highest-numbered physical page of the selected pages.

12. The method as claims in claim 7, wherein, in the writing the data to the empty first sector and the empty second sector does not depend on whether an offset of the data to be written matches an offset of the empty first sector.

13. A flash memory comprising at least one block having a plurality of physical pages, each page comprising a predetermined number of sectors, wherein:
the flash memory determines in a first step whether a first sector wherein an offset of the first sector matches an offset of data to be written, is empty in a first physical page of the plurality of the pages having a most recently written logical page number of the data to be written, and if it is determined in the first step that the first sector of which the offset matches, is empty, the flash memory writes the data to the first sector of which the offset matches, in the first physical page, or if it is determined in the first step that the first sector of which the offset matches, is not empty, the flash memory selects an empty second physical page to write the data to a second sector wherein an offset of the second sector matches the offset of the data to be written, and writes the most recently written logical page number for the data to the selected empty second physical page, wherein, prior to the first step, whether a logical page number of the data to be written has ever been written is determined and, if the logical page number has been written, the first step is performed, and, otherwise, the data and the logical page number of the data is written to a position prescribed by an existing physical logical mapping information.

14. The flash memory as claimed in claim 13, wherein determining whether the first sector is empty determines concurrently whether the first sector of which the offset matches the offset of the data to be written, is empty in the first physical page having the most recently written logical page number of the data to be written, and whether all sectors following the first sector in the first physical page are empty, and wherein, in the first step, the data is written in the first sector of the first physical page only if the all sectors following the first sector are empty as a result of the determining in the first step.

15. The flash memory as claimed in claim 13 or 14, wherein the data are first data and second data other than the first data among a plurality of data written to an existing valid logical page having the most recently written logical page number, is copied to the selected empty second physical page.

16. A flash memory including at least one block having a plurality of pages, each page comprising a predetermined number of sectors, wherein:
the flash memory determines in the first step whether an empty first sector exists in a first physical page of the plurality of the pages having a most recently written logical page number of data to be written, the empty first sector being capable of storing the data to be written, and if it is determined in the first step that an empty first sector exists, the flash memory writes the data to the empty first sector in the first physical page and writes a logical sector number for the data to the first physical page, or if it is determined in the first step that the empty first sector does not exist, an empty second physical page is selected to write the data to an empty second sector in the selected empty second physical page, and to write the most recently written logical page number and the logical sector number for the data to the selected empty second physical page.

17. The flash memory as claimed in claim 16, wherein writing the logical sector number in the second step and the third step comprises writing the logical sector number to a position of a spare area corresponding to a position of one of the empty first and the empty second sectors in a main area of one of the first physical page and the empty second physical page to which data are written.

18. The flash memory as claimed in claim 16, wherein the data are first data and second data other than the first data and the logical sector number thereof among a plurality of data written to an existing valid logical page having the most recently written logical page number is copied to one of the first physical page and the selected empty second physical page.

19. The flash memory as claimed in claim 16, wherein, in the writing the data to the empty first sector and the empty second sector does not depend on whether an offset of the data to be written matches an offset of the empty first sector.

* * * * *